(12) United States Patent
Cao et al.

(10) Patent No.: US 11,300,792 B2
(45) Date of Patent: Apr. 12, 2022

(54) EYEPIECE OPTICAL SYSTEM AND HEAD-MOUNTED DISPLAY

(71) Applicant: Shenzhen Nade Optical Co., Ltd, Guangdong (CN)

(72) Inventors: Hongpeng Cao, Guangdong (CN); Jianfei Guo, Guangdong (CN); Huajun Peng, Guangdong (CN)

(73) Assignee: Shenzhen Nade Optical Co., Ltd, Shenzhen (CN)

( * ) Notice: Subject to any disclaimer, the term of this patent is extended or adjusted under 35 U.S.C. 154(b) by 175 days.

(21) Appl. No.: 16/920,406

(22) Filed: Jul. 2, 2020

(65) Prior Publication Data
US 2021/0033866 A1      Feb. 4, 2021

Related U.S. Application Data

(63) Continuation of application No. PCT/CN2019/098202, filed on Jul. 29, 2019.

(51) Int. Cl.
| | | |
|---|---|---|
| *G06F 3/01* | (2006.01) | |
| *G02B 27/01* | (2006.01) | |
| *G02B 1/04* | (2006.01) | |
| *G02B 25/00* | (2006.01) | |
| *G02B 9/60* | (2006.01) | |

(52) U.S. Cl.
CPC ......... *G02B 27/0172* (2013.01); *G02B 1/041* (2013.01); *G02B 9/60* (2013.01); *G02B 25/001* (2013.01)

(58) Field of Classification Search
CPC ........ G02B 27/172; G02B 1/041; G02B 9/60; G02B 25/001; G06F 3/011–015
See application file for complete search history.

(56) References Cited

U.S. PATENT DOCUMENTS

| | | | | |
|---|---|---|---|---|
| 5,659,424 A | * | 8/1997 | Osawa | ................... G02B 13/24 359/714 |
| 7,978,417 B2 | | 7/2011 | Nishio et al. | |
| 8,345,139 B2 | | 1/2013 | Miyazawa et al. | |

(Continued)

FOREIGN PATENT DOCUMENTS

| | | |
|---|---|---|
| CN | 101887166 B | 7/2012 |
| CN | 103217782 A | 7/2013 |

(Continued)

*Primary Examiner* — Sanghyuk Park

(57) ABSTRACT

An eyepiece optical system and a head-mounted display are disclosed. The optical system comprises a first lens, a second lens, a third lens, a fourth lens, and a fifth lens arranged coaxially and successively along an optical axis direction from an eye viewing side to a displayer side, wherein a focal length of the second lens is $f_2$, a focal length of a lens group formed by the third lens and the fourth lens is $f_{34}$, a focal length of the fifth lens is $f_5$, a distance from a display of the optical system to the fifth lens proximate to a surface of the display is $f_d$, and a total system length is $f_w$. When a particular relation is satisfied, on the basis of cost reduction and weight reduction, significant elimination of system aberration as well as high-quality optical indices can be achieved.

17 Claims, 21 Drawing Sheets

(56) References Cited

U.S. PATENT DOCUMENTS

| | | | | |
|---|---|---|---|---|
| 2003/0067776 A1* | 4/2003 | Kodama | ............ | G02B 27/1046 |
| | | | | 362/268 |
| 2015/0036229 A1* | 2/2015 | Yamamoto | ......... | G02B 13/0045 |
| | | | | 359/770 |
| 2016/0320619 A1* | 11/2016 | Watanabe | ................ | G02B 3/06 |
| 2017/0371173 A1* | 12/2017 | Bietry | ................ | G02B 26/0891 |
| 2020/0183128 A1* | 6/2020 | Lee | ...................... | H04N 13/239 |

FOREIGN PATENT DOCUMENTS

| | | |
|---|---|---|
| CN | 103988111 A | 8/2014 |
| CN | 104603669 A | 5/2015 |
| CN | 104685402 A | 6/2015 |
| CN | 104730706 A | 6/2015 |
| CN | 107024766 A | 8/2017 |
| CN | 108375829 A | 8/2018 |

* cited by examiner

EYEPIECE OPTICAL SYSTEM AND HEAD-MOUNTED DISPLAY

CROSS REFERENCE TO RELATED APPLICATIONS

The present application is a Continuation Application of PCT Application No. PCT/CN2019/098202 filed on Jul. 29, 2019, the contents of which are incorporated herein by reference in their entirety.

TECHNICAL FIELD

The present invention relates to eyepiece optical systems and head-mounted playback devices, and more particularly, to an eyepiece optical system and a head-mounted display.

BACKGROUND

With the development of electronic devices to ultra miniaturization and the development of new computers, microelectronics, optoelectronics devices, and communications theories and technologies, a new mode such as wearable computing based on "people-oriented" and "unity of man and machine" has become possible, and is emerging in military, industrial, medical, educational, consumption and other fields. In a typical wearable computing architecture, a head-mounted display device is a key component. The head-mounted display device directs the video image light emitted from a miniature image displayer (e.g., a transmissive or reflective liquid crystal displayer, an organic electroluminescent element, or a DMD element) to the pupil of the user by optical technology to implement virtual magnified images in the near-eye range of the user, so as to provide the user with intuitive, visual images, video, text information. The eyepiece optical system is the core of the head-mounted display device, which realizes the function of displaying a miniature image in front of human eyes to form a virtual magnified image.

The head-mounted display device develops in the direction of compact size, light weight, convenient wearing, and load reduction. Meanwhile, a large field-of-view angle and visual comfort experience have gradually become key factors to evaluate the quality of the head-mounted display device. The large field-of-view angle determines a visual experience effect of high liveness, and high image quality and low distortion determine the comfort of visual experience. To meet these requirements, the optical system should try its best to achieve such indexes as a large field-of-view angle, high image resolution, low distortion, small field curvature, and a small volume. It is a great challenge for system design and aberration optimization to satisfy the above optical properties at the same time.

A common optical system comprises five coaxial lenses with a positive focal length, a negative focal length, a positive focal length, a positive focal length, and a negative focal length respectively. In Patent Document 1 (US Patent Publication No. U.S. Pat. No. 7,978,417B2), Patent Document 2 (Chinese Patent Publication No. CN103988111A), Patent Document 3 (Chinese Patent Publication No. CN104730706A), Patent Document 4 (Chinese Patent Publication No. CN103217782A), Patent Document 5 (Chinese Patent Publication No. CN104685402A), Patent Document 6 (US Patent Publication No. U.S. Pat. No. 8,345,139B2), Patent, Document 7 (Chinese Patent Publication No. CN101887166B), and Patent Document 8 (Chinese Patent Publication No. CN104603669A), an optical system composed of a positive lens, a negative lens, and a positive lens that are coaxial is provided respectively, achieving the effect of low distortion (<3%) and high image quality. However, an effective field-of-view angle of the above optical system is small, ranging from 160 to 37 respectively, which does not achieve the effect of a large field-of-view angle.

In Patent Document 9 (Chinese Patent Publication No. CN 107024766 A), an eyepiece system for head-mounted display is provided, which is composed of a positive lens, a negative lens, a positive lens, a positive lens, and a negative lens, and can be regarded as a positive-negative-positive-positive-negative optical system on the whole. The eyepiece system can achieve the effect of a large field-of-view angle (>40°); however, the second negative lens of the eyepiece improves a performance ratio of the whole optical system more efficiently due to the curvature, increases an outer diameter value of the front lens, and increases processing difficulty of the whole optical product.

SUMMARY

The technical problem to be solved in the present invention is to provide an eyepiece optical system and a head-mounted display, aiming at the above defects of the prior art.

The technical solutions adopted in the present invention to solve the technical problem thereof are as follows.

An eyepiece optical system, wherein the optical system comprises a first lens, a second lens, a third lens, a fourth lens, and a fifth lens arranged coaxially and successively along an optical axis direction from an eye viewing side to a displayer side, wherein a focal length of the second lens is $f_2$, a focal length of a lens group formed by the third lens and the fourth lens is $f_{34}$, a focal length of the fifth lens is $f_5$, a back focal length from a display of the optical system to the fifth lens proximate to a surface of the display is $f_d$, a total system length is $f_w$, and they satisfy following relations (1), (2), (3), and (4):

$$-4.00 \leq f_2/f_w \leq -0.50 \quad (1);$$

$$0.35 \leq f_{34}/f_w \quad (2);$$

$$-10.00 \leq f_5/f_w \leq 0.20 \quad (3); \text{ and}$$

$$0.10 \leq f_d/f_w \leq 0.50 \quad (4).$$

As a further solution of the present invention, the first lens, the third lens, and the fourth lens are all positive lenses, the second lens and the fifth lens are negative lenses, and the first lens, the second lens, the third lens, the fourth lens, and the fifth lens are made of glass materials or plastic materials.

As a further solution of the present invention, the materials of the first lens, the second lens, and the third lens satisfy following relations (5), (6), and (7):

$$1.40 < Nd_1 < 1.90 \quad (5);$$

$$1.40 < Nd_2 < 1.80 \quad (6);$$

$$1.60 < Nd_3 < 1.90 \quad (7);$$

wherein $Nd_1$, $Nd_2$, and $Nd_3$ are material refractive indices of the first lens, the second lens, and the third lens, respectively.

As a further solution of the present invention, the materials of the first lens, the second lens, and the third lens satisfy following relations (8), (9), and (10):

$$40.0 < Vd_1 < 95.0 \quad (8);$$

$$19.0 < Vd_2 < 60.0 \quad (9);$$

$$28.0 < Vd_3 < 57.0 \quad (10);$$

wherein $Vd_1$, $Vd_2$, and $Vd_3$ represent Abbe coefficients of the first lens, the second lens, and the third lens, respectively.

As a further solution of the present invention, the first lens has a first optical surface convex to an eye and a second optical surface concave to the eye;

the second lens has a third optical surface convex to the eye and a fourth optical surface concave to the eye;

the third lens has a fifth optical surface convex to the eye and a sixth optical surface convex to an image plane;

the fourth lens has a seventh optical surface convex to the eye and an eighth optical surface convex to the image plane; and the fifth lens has a ninth optical surface concave to the image plane and a tenth optical surface concave to the eye.

As a further solution of the present invention, among the ten optical surfaces from the first optical surface to the tenth optical surface, several optical surfaces have even-order aspherical face shapes, and a formula of their face shapes is as following expression (11):

$$Z = \frac{cr^2}{1 + \sqrt{1-(1+k)c^2r^2}} + \alpha_2 r^2 + \alpha_4 r^4 + \alpha_6 r^6 + \ldots \quad (11)$$

As a further solution of the present invention, the second optical surface on the first lens, the fifth optical surface and the sixth optical surface on the third lens, and the eighth optical surface on the fourth lens are spherical face shapes, and the other optical surfaces are all even-order aspherical face shapes.

As a further solution of the present invention, a curvature radius of the optical surface of the fifth lens proximate to a human eye side is $R_{51}$, a curvature radius of the optical surface proximate to the side of the display is $R_{52}$, and $R_{51}$ and $R_{52}$ satisfy following relation (12):

$$0.5 \leq |(R_{51}+R_{52})/(R_{51}-R_{52})| \leq 4.0 \quad (12).$$

As a further solution of the present invention, a curvature radius of the optical surface of the second lens proximate to a human eye side is $R_{21}$, a curvature radius of the optical surface proximate to the side of the display is $R_{22}$, and $R_{21}$ and $R_{22}$ satisfy following relation (13):

$$0.8 \leq (R_{21}+R_{22})/(R_{21}-R_{22}) \leq 6.0 \quad (13).$$

As a further solution of the present invention, the focal lengths of the second lens, the third lens, the fourth lens, and the fifth lens further satisfy following relations (1a), (2a), (3a), and (4a):

$$-3.60 \leq f_2/f_w \leq -0.85 \quad (1a);$$

$$0.40 \leq f_{34}/f_w \quad (2a);$$

$$-9.95 \leq f_5/f_w \leq 0.180 \quad (3a); \text{ and}$$

$$0.175 \leq f_4/f_w \leq 0.415 \quad (4a).$$

As a further solution of the present invention, the refractive indices $Nd_1$, $Nd_2$, and $Nd_3$ of the first lens, the second lens, and the third lens further satisfy following relations (5a), (6a), and (7a):

$$1.50 < Nd_1 < 1.85 \quad (5a);$$

$$1.45 < Nd_2 < 1.75 \quad (6a); \text{ and}$$

$$1.63 < Nd_3 < 1.87 \quad (7a).$$

As a further solution of the present invention, the Abbe coefficients $Vd_1$, $Vd_2$, and $Vd_3$ of the first lens, the second lens, and the third lens further satisfy following relations (8a), (9a), and (10a):

$$41.5 < Vd_1 < 90.5 \quad (8a);$$

$$20.0 < Vd_2 < 56.0 \quad (9a); \text{ and}$$

$$29.0 < Vd_3 < 56.0 \quad (10a).$$

As a further solution of the present invention, the curvature radii $R_{51}$ and $R_{52}$ of the fifth lens further satisfy following relation (12a):

$$0.51 \leq |(R_{51}+R_{52})/(R_{51}-R_{52})| \leq 3.5 \quad (12a).$$

As a further solution of the present invention, the curvature radii $R_{21}$ and $R_{22}$ of the second lens further satisfy following relation (13a):

$$0.9 \leq (R_{21}+R_{22})/(R_{21}-R_{22}) \leq 5.5 \quad (13a).$$

A head-mounted display, comprising a miniature image display unit and an eyepiece located between human eyes and the miniature image display unit, wherein the eyepiece comprises the eyepiece optical system according to any of the above.

As a further solution of the present invention, a distance between the tenth optical surface on the fifth lens and the miniature image display unit is adjustable.

As a further solution of the present invention, the head-mounted display is a double-eye head-mounted display comprising same two of the eyepiece optical systems.

The present invention has following beneficial effects: a combination of five lenses is adopted in the present invention, and when focal lengths of the lenses satisfy particular conditions, system aberration can be significantly eliminated, especially optical indexes such as a large field-of-view angle, low distortion, low chromatism, low field curvature, and low astigmatism can be achieved at the same time; thus an observer can watch large images of full frame, high definition and uniform image quality without any distortion and get visual experience of high liveness via the eyepiece optical system according to the present invention.

BRIEF DESCRIPTION OF THE DRAWINGS

In order to more clearly illustrate the embodiments of the present invention or the technical solutions in the prior art, the present invention is further illustrated combining the embodiments and drawings attached. The drawings in the following description are only some embodiments of the present invention. For one of ordinary skill in the art, other drawings may be obtained from these drawings without any inventive work.

DETAILED DESCRIPTION OF THE PREFERRED EMBODIMENT

In order to clarify the objects, technical solutions and advantages of the embodiments of the present invention, the following clear and complete description will be made for the technical solution in the embodiments of the present invention. Apparently, the described embodiments are just some rather than all embodiments of the present invention. All other embodiments obtained by one of ordinary skill in the art without any inventive work based on the embodiments disclosed in the present invention fall into the scope of the present invention.

Figure 1:
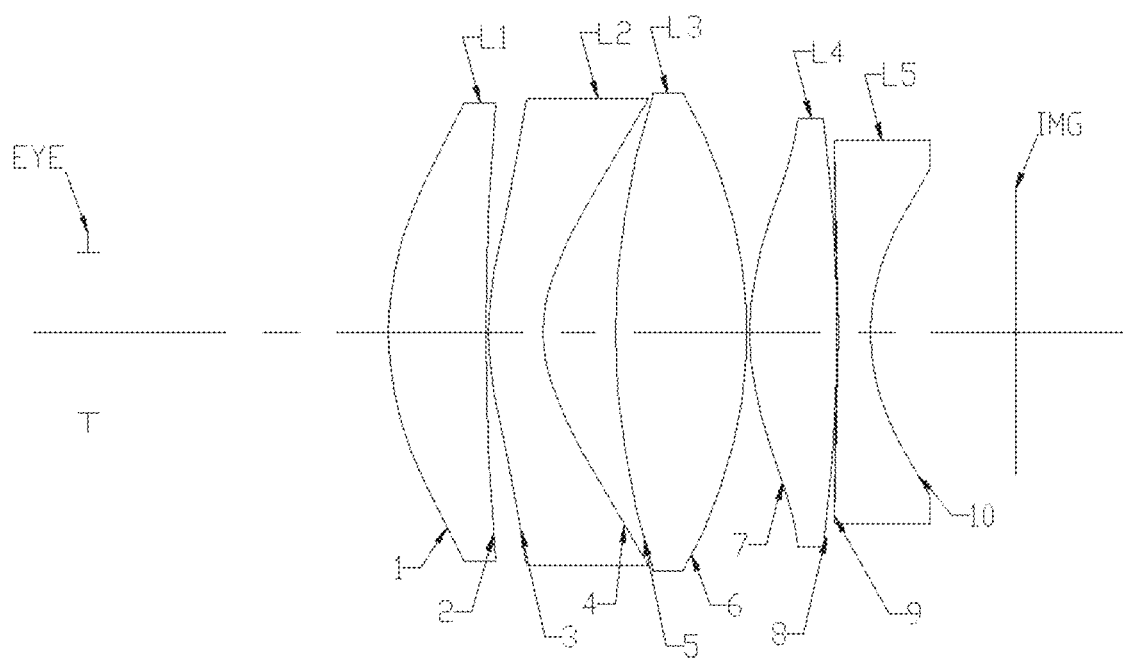
FIG. 1 is a schematic structural diagram of an eyepiece optical system according to a first embodiment of the present invention.

As shown in FIG. 1, referring to FIG. 7, FIG. 11, FIG. 15, and FIG. 20 together, an eyepiece optical system is illustrated. The optical system comprises a first lens L1, a second lens L2, a third lens L3, a fourth lens L4, and a fifth lens L5 arranged coaxially and successively along an optical axis direction from an eye viewing side to a displayer side, wherein a focal length of the second lens L2 is $f_2$, a focal length of a lens group formed by the third lens L3 and the fourth lens L4 is $f_{34}$, a focal length of the fifth lens L5 is $f_5$, a distance from a display of the optical system to the fifth lens L5 proximate to an optical surface of the display is $f_d$, a total system length is $f_w$, and they satisfy following relations (1)-(4):

$$-4.00 \leq f_2/f_w \leq -0.50 \quad (1);$$

$$0.35 \leq f_{34}/f_w \quad (2);$$

$$-10.00 \leq f_5/f_w \leq 0.20 \quad (3); \text{ and}$$

$$0.10 \leq f_d/f_w \leq 0.50 \quad (4).$$

The value of the $f_2/f_w$ may be −4.00, −0.5, −2.0, −2.5, −3.18, −1.57, −0.76, −0.99, −3.75, −3.66, −2.25, −2.74, −1.83, −1.76, −0.55, −3.55, −0.89, −3.6, −0.85, −2.75, −1.04, −1.22, −2.99, or −3.26.

The first lens L1, the third lens L3, and the fourth lens L4 are all positive lenses, the second lens L2 and the fifth lens L5 are negative lenses, and the first lens L1, the second lens L2, the third lens L3, the fourth lens L4, and the fifth lens L5 are made of glass materials or plastic materials.

The materials of the first lens L1, the second lens L2, and the third lens L3 satisfy following relations (5)-(10):

$$1.40 < Nd_1 < 1.90 \quad (5);$$

$$1.40 < Nd_2 < 1.80 \quad (6);$$

$$1.60 < Nd_3 < 1.90 \quad (7);$$

$$40.0 < Vd_1 < 95.0 \quad (8);$$

$$19.0 < Vd_2 < 60.0 \quad (9);$$

$$28.0 < Vd_3 < 57.0 \quad (10);$$

wherein $Nd_1$, $Nd_2$, and $Nd_3$ are material refractive indices of the first lens, the second lens, and the third lens, respectively; and $Vd_1$, $Vd_2$, and $Vd_3$ represent Abbe coefficients of the first lens, the second lens, and the third lens, respectively.

The value of $Nd_1$ may be 1.40, 1.90, 1.50, 1.45, 1.61, 1.66, 1.57, 1.70, 1.73, 1.82, 1.49, or 1.83.

The value of $Nd_2$ may be 1.40, 1.80, 1.44, 1.49, 1.77, 1.55, 1.62, 1.65, 1.68, 1.70, 1.73, 1.50, or 1.74.

The value of $Nd_3$ may be 1.60, 1.90, 1.62, 1.69, 1.77, 1.86, 1.88, 1.65, 1.70, 1.73, 1.80, 1.71, or 1.82.

The value of $Vd_1$ may be 40, 95, 42, 90, 50.6, 42.9, 89.3, 87, 44.4, 46.8, 57.4, 60, 75.5, or 80.

The value of $Vd_2$ may be 20.4, 55, 19, 60, 20, 57.6, 55.4, 49.8, 19.5, 21, 26.2, 28.5, 30.3, or 45.5.

The value of $Vd_3$ may be 30, 55.6, 28, 57, 28.3, 29.1, 29.9, 55.8, 56.6, 35, 37.4, 38.1, 40.3, 46.8, or 55.

The first lens L1 has a first optical surface 1 convex to an eye and a second optical surface 2 concave to the eye;

the second lens L2 has a third optical surface 3 convex to the eye and a fourth optical surface 4 concave to the eye;

the third lens L3 has a fifth optical surface 5 convex to the eye and a sixth optical surface 6 convex to an image plane;

the fourth lens L4 has a seventh optical surface 7 convex to the eye and an eighth optical surface 8 convex to the image plane; and the fifth lens L5 has a ninth optical surface 9 concave to the image plane and a tenth optical surface 10 concave to the eye.

Among ten optical surfaces of the five lenses in the present invention, several optical surfaces are aspherical face shapes. Preferably, the first optical surface 1 on the first lens L1, the third optical surface 3 and the fourth optical surface 4 on the second lens L2, the seventh optical surface 7 on the fourth lens L4, and the ninth optical surface 9 and the tenth optical surface 10 on the fifth lens L5 are even-order aspherical face shapes, and a formula of their face shapes is as following expression (11):

$$Z = \frac{cr^2}{1 + \sqrt{1 - (1+k)c^2r^2}} + \alpha_2 r^2 + \alpha_4 r^4 + \alpha_6 r^6 + \ldots \quad (11)$$

Z is a vector height of the optical surface, c is a curvature at the aspherical vertex, k is an aspherical coefficient, and $\alpha 2, 4, 6 \ldots$ are coefficients of various orders, and r is a distance coordinate from a point on a surface to an optical axis of a lens system.

The second optical surface 2 on the first lens L1, the fifth optical surface L5 and the sixth optical surface L6 on the third lens L3, and the eighth optical surface L8 on the fourth lens L4 are spherical face shapes.

A curvature radius of the ninth optical surface 9 of the fifth lens L5 proximate to a human eye side is $R_{51}$, a curvature radius of the tenth optical surface 10 proximate to the side of the display is $R_{52}$, and $R_{51}$ and $R_{52}$ satisfy following relation:

$$0.5 \leq |(R_{51} + R_{52})/(R_{51} - R_{52})| \leq 4.0 \quad (12).$$

A lower limit of the relation is greater than 0.5, so that the fifth lens L5 can provide sufficient negative power, so as to better balance correction of the system aberration and achieve a good optical effect. An upper limit of the relation is less than 4.0, which reduces the correction difficulty of spherical aberration and facilitates realization of a large optical aperture. The value of the relation may be 0.5, 4.0, 0.52, 3.5, 3.8, 3.91, 3.66, 3.58, 0.55, 0.8, 1.2, 1.8, 2.2, 2.9, 3.15, 2.51, 2.63, 2.93, 1.51, 1.33, 1.71, 1.69, 0.77, 0.51, or 3.39.

A curvature radius of the third surface 3 of the second lens L2 proximate to a human eye side is $R_{21}$, a curvature radius of the fourth surface 4 proximate to the side of the display is $R_{22}$, and $R_{21}$ and $R_{22}$ satisfy following relation:

$$0.8 \leq (R_{21} + R_{22})/(R_{21} - R_{22}) \leq 6.0 \quad (13).$$

A lower limit of the relation is greater than 0.8, so that the second lens L2 can provide sufficient negative power, so as to better balance correction of the system aberration and achieve a good optical effect. An upper limit of the relation is less than 6.0, which reduces the correction difficulty of spherical aberration and facilitates realization of a large optical aperture. The value of the relation may be 0.8, 6.0, 1.0, 5.2, 0.9, 5.5, 0.85, 5.3, 0.93, 0.97, 1.47, 1.68, 1.96, 2.31, 2.5, 2.66, 2.79, 3.01, 3.2, 3.48, 3.61, 3.89, 4.12, 4.41, 4.52, 4.67, 4.81, 4.98, or 5.11.

The present invention will now be further described with reference to the accompanying drawings and specific embodiments. In the optical path diagrams of the following embodiments, the light emitted from the displayer sequentially passes through the fifth lens L5, the fourth lens L4, the third lens L3, the second lens L2, and the first lens L1, and then enters the human eyes. The diaphragm can be the exit pupil of imaging for the optical system. It is a virtual aperture. The best imaging effect can be observed when the pupil of the human eye is positioned at the diaphragm location.

The spot diagrams provided by the following embodiments reflecting the geometric structure of the optical imaging system, can be represented by dispersion spots formed by the section of the specified wavelength light focused on the image plane in the specified field, while ignoring the diffraction effect, and meanwhile, it can comprise multiple field-of-views and lights of multiple wavelengths. Therefore, the imaging quality of the optical system can be evaluated intuitively through the intensive degree, the shape and size of the dispersion spots in the spot diagram, while the chromatism of the optical system can also be evaluated intuitively through the misalignment degree of the dispersion spots with different wavelengths in the spot diagram. The smaller the root-mean-square radius (RMS) of the spot diagram, the higher the imaging quality of the optical system.

Embodiment 1

A schematic structural diagram of the eyepiece optical system is as shown in FIG. 1, comprising a first lens L1, a second lens L2, a third lens L3, a fourth lens L4, and a fifth lens L5 arranged coaxially and successively along an optical axis direction from an eye viewing side to a displayer side. The optical surface closer to the diaphragm side is marked as 1, and by analogy, the optical surfaces from the diaphragm to the image plane are sequentially marked as 2, 3, 4, 5, 6, 7, 8, 9 and 10. The present embodiment can sufficiently correct aberrations, such as distortion, chromatism, and field curvature of the optical system, and provide a large field-of-view angle while guaranteeing a small volume.

TABLE 1

List of parameters of the optical system of Embodiment 1

| Surface | Curvature radius | Thickness | Glass | | Net caliber | Cone coefficient |
| | | | Refractive index | Abbe number | | |
| --- | --- | --- | --- | --- | --- | --- |
| Diaphragm | Infinite | 14 | | | 7.5 | 0 |
| 1 | 21.284 | 4.682 | 1.531 | 56.0 | 19.093 | −10.841 |
| 2 | −18.63 | 0.571 | | | 20.021 | 0 |
| 3 | 18.382 | 3.164 | 1.642 | 22.406 | 22.349 | −18.418 |

TABLE 1-continued

List of parameters of the optical system of Embodiment 1

| Surface | Curvature radius | Thickness | Glass Refractive index | Abbe number | Net caliber | Cone coefficient |
|---|---|---|---|---|---|---|
| 4 | 6.5109 | 4.781 | | | 21.874 | −3.07 |
| 5 | 71.45 | 6.829 | 1.80 | 46.56 | 22.19 | 0 |
| 6 | −16.94 | 0.125 | | | 23.16 | 0 |
| 7 | 16.302 | 4.49 | 1.809 | 41.00 | 21.280 | 0.18 |
| 8 | −47.65 | 0.099 | | | 20.559 | 0 |
| 9 | 32.752 | 1.31 | 1.64 | 22.406 | 18.414 | −24.96 |
| 10 | 6.43644 | 5.807 | | | 15.596 | −2.18 |
| Image plane | Infinite | | | | | |

Figure 2:
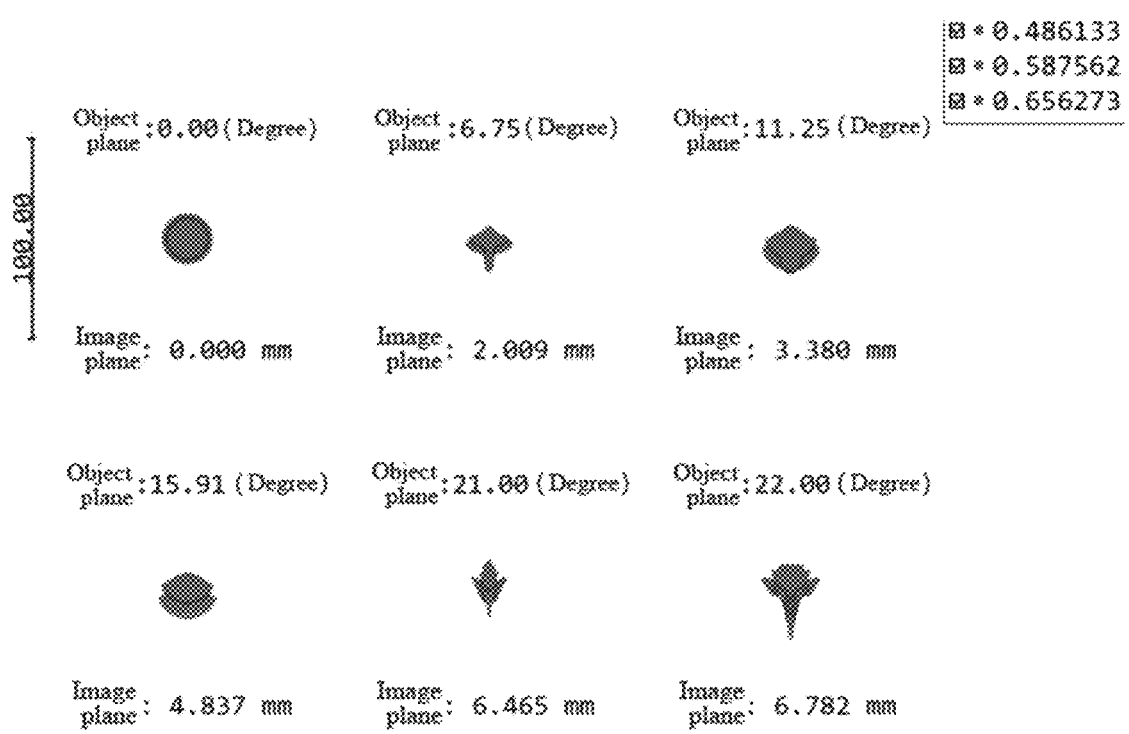
FIG. 2 is a schematic spot diagram of the eyepiece optical system according to the first embodiment of the present invention.

As shown in FIG. 2, the lights of different field-of-views in the present embodiment have dispersion spots of small and uniform radii on the image plane (display device), and the dispersion spots formed by focusing lights of different wavelengths at the same field-of-view have low misalignment degree, such that the aberration of the optical system is finely corrected and a display image of integral uniformity and high optical performance can be observed through the eyepiece optical system.

Figure 3:
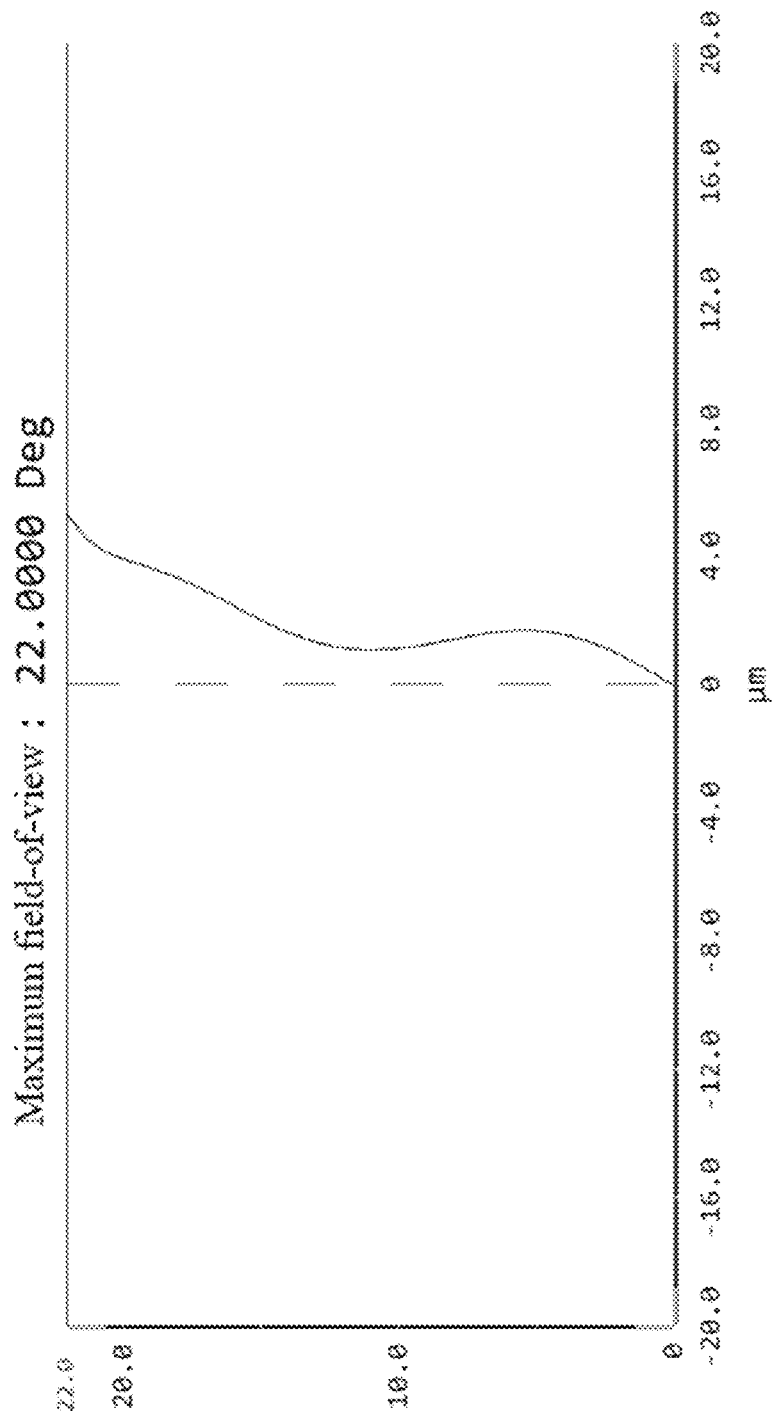
FIG. 3 is a schematic diagram of longitudinal chromatism of the eyepiece optical system according to the first embodiment of the present invention.

FIG. 3 shows a variation curve of longitudinal chromatism of the optical system, in which, with specified chromatism in a specified field-of-view, chromatism variations of each field can be produced in a two-dimensional plane.

Figure 4:
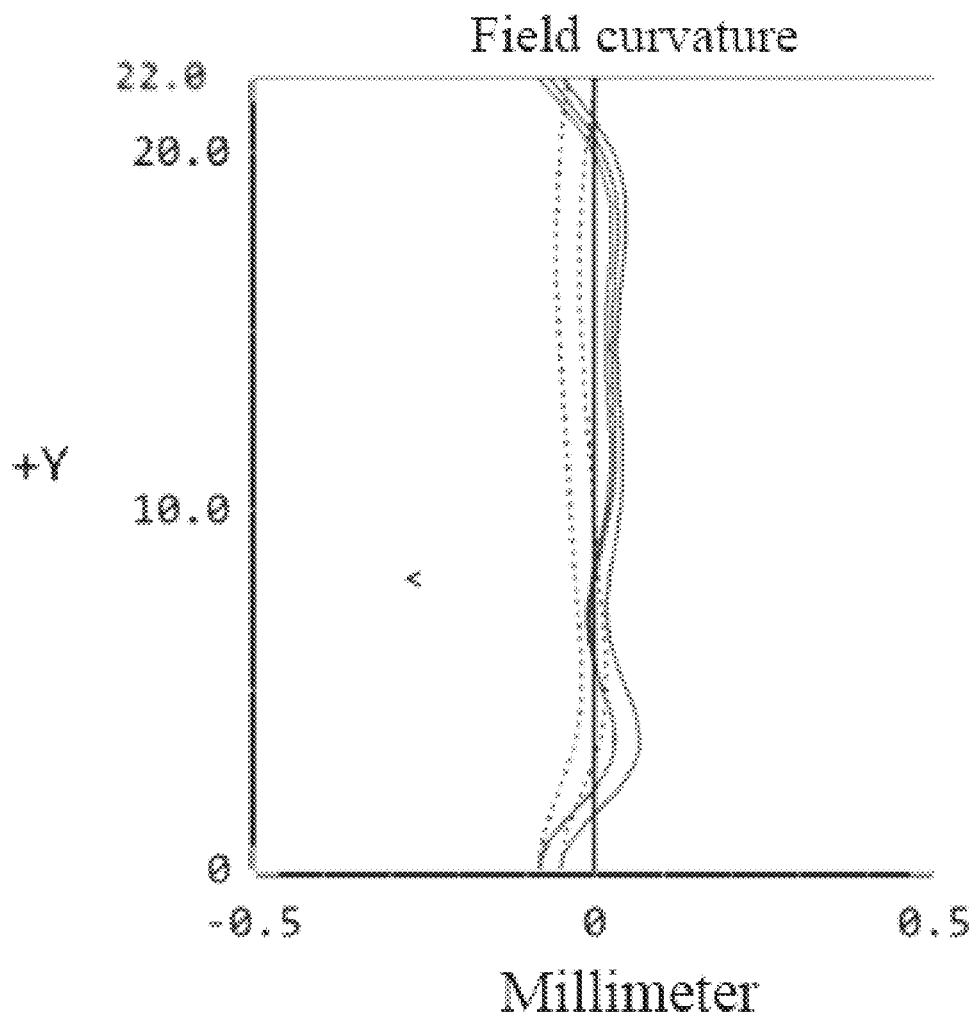
FIG. 4 is a schematic diagram of a field curvature curve of the eyepiece optical system according to the first embodiment of the present invention.
Figure 5:
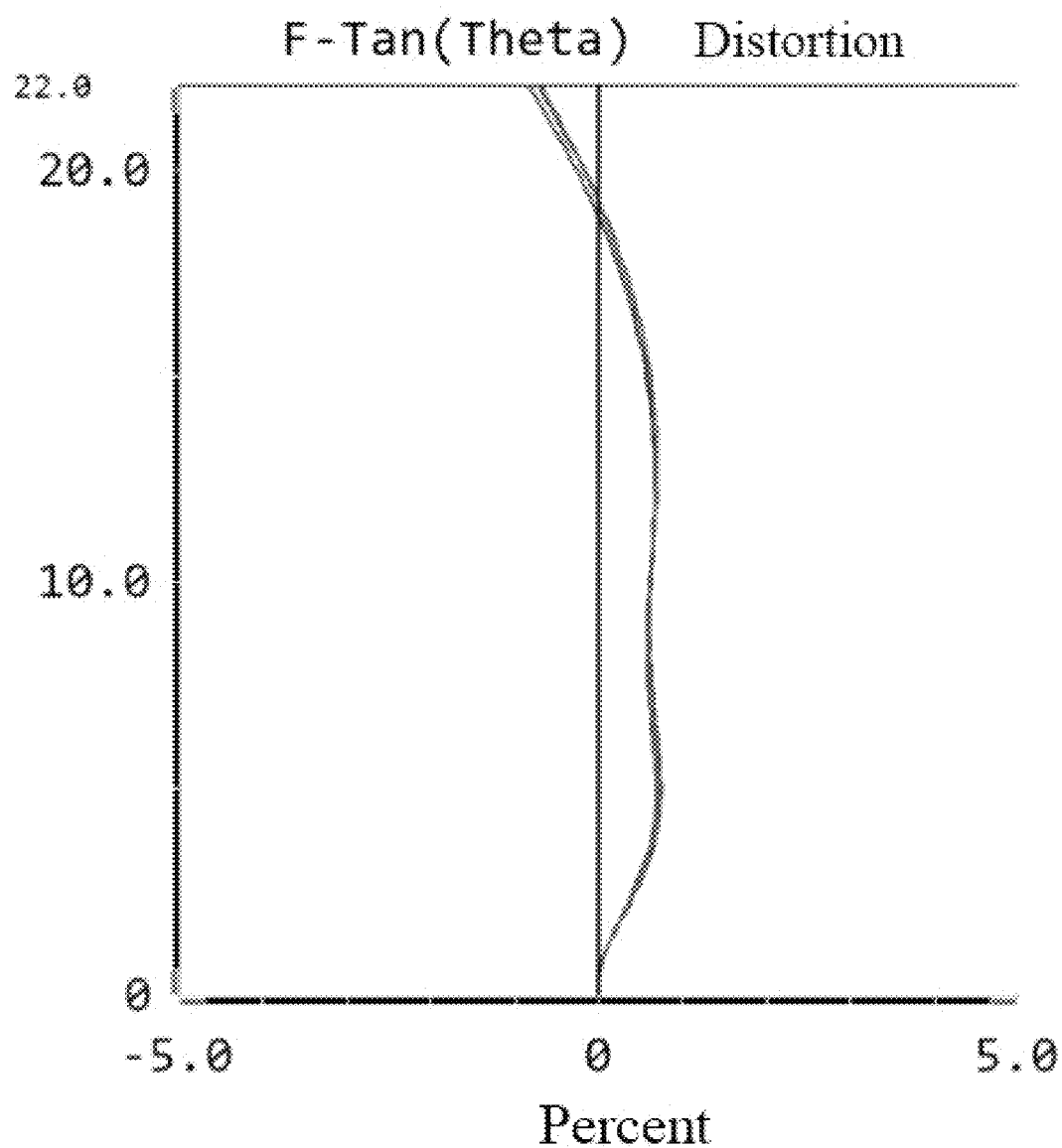
FIG. 5 is a schematic diagram of a distortion curve of the eyepiece optical system according to the first embodiment of the present invention.
Figure 6:
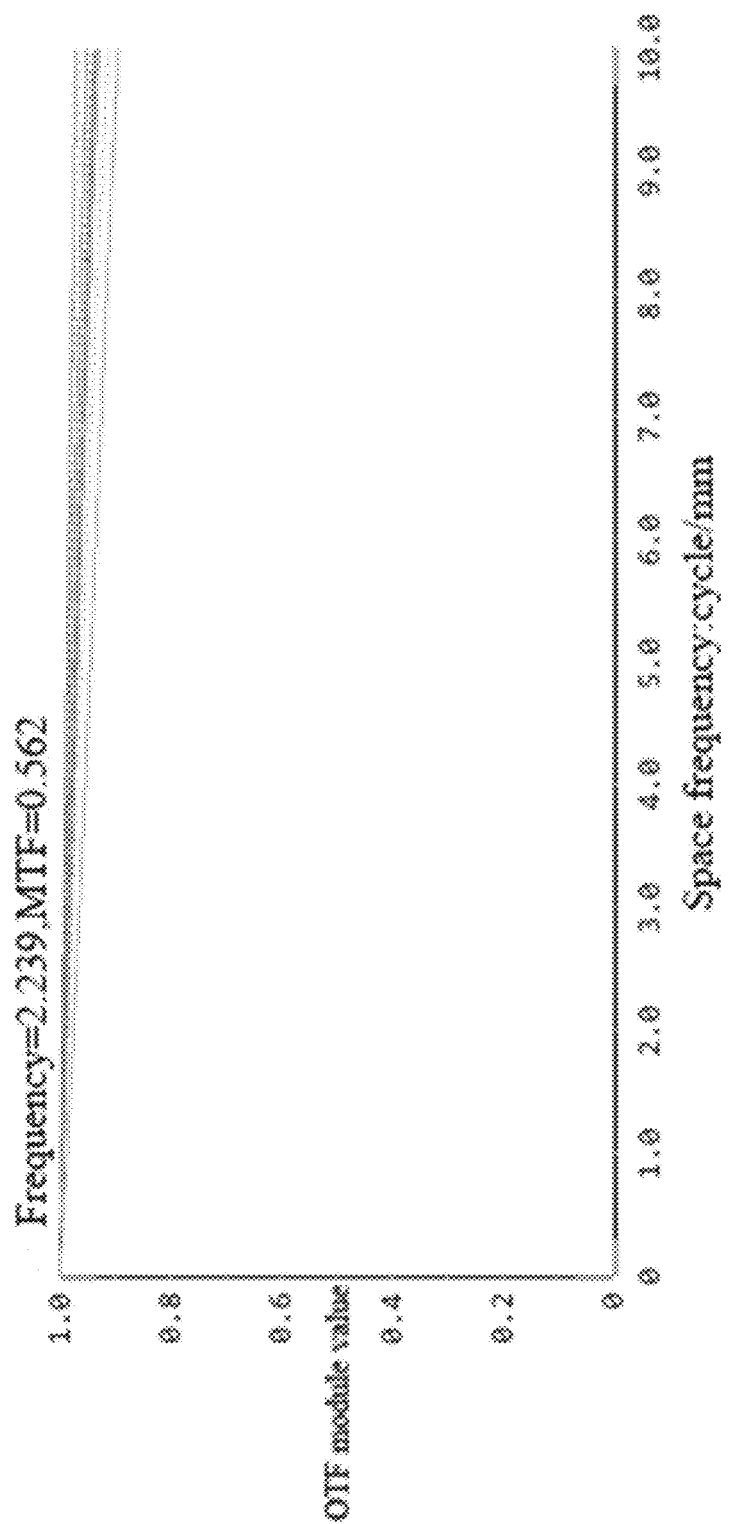
FIG. 6 is a schematic diagram of a modulation transfer function (MTF) of the eyepiece optical system according to the first embodiment of the present invention.

FIG. 4 to FIG. 6 have respectively shown the field curvature and distortion curves of the optical system according to the present embodiment, by which the characteristics of the optical system according to the present embodiment such as super large field-of-view and high imaging quality and so on, have been represented.

Embodiment 2

Figure 7:
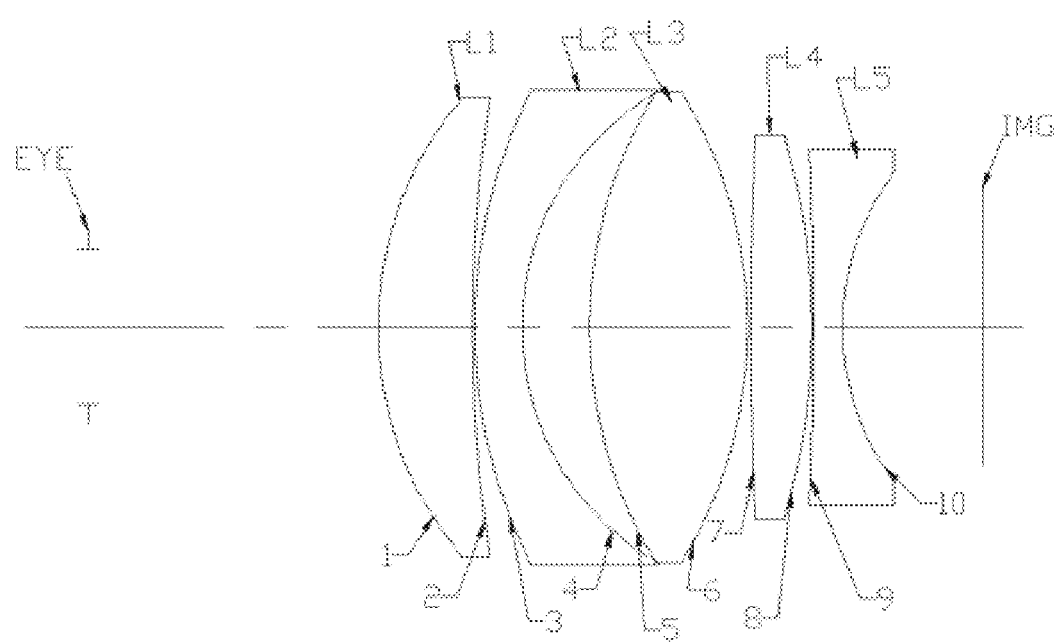
FIG. 7 is a schematic structural diagram of an eyepiece optical system according to a second embodiment of the present invention.

A schematic structural diagram of the eyepiece optical system is as shown in FIG. 7, comprising a first lens L1, a second lens L2, a third lens L3, a fourth lens L4, and a fifth lens L5 arranged coaxially and successively along an optical axis direction from an eye viewing side to a displayer side. The optical surface closer to the diaphragm side is marked as 1, and by analogy, the optical surfaces from the diaphragm to the image plane are sequentially marked as 2, 3, 4, 5, 6, 7, 8, 9 and 10. The present embodiment can sufficiently correct aberrations, such as distortion, chromatism, and field curvature of the optical system, and provide a large field-of-view angle while guaranteeing a small volume.

TABLE 2

List of parameters of the optical system of Embodiment 2

| Surface | Curvature radius | Thickness | Glass Refractive index | Abbe number | Net caliber | Cone coefficient |
|---|---|---|---|---|---|---|
| Diaphragm | Infinite | 14 | | | 7.5 | 0 |
| 1 | 13.959 | 4.574 | 1.491 | 57.44 | 22.08014 | −0.8148515 |
| 2 | 72.462 | 0.0998 | | | 22.26772 | 0 |
| 3 | 9.197 | 2.303 | 1.61 | 26.64 | 22.95211 | −5.453292 |
| 4 | 5.416 | 3.225 | | | 22.87977 | −2.77595 |
| 5 | 21.49 | 7.659 | 1.80 | 46.568 | 22.72535 | 0 |
| 6 | −21.73 | 0.1435 | | | 22.78356 | 0 |
| 7 | 17.85 | 2.9064 | 1.809995 | 41.00 | 18.64482 | −1.092319 |
| 8 | −32.02 | 0.0986 | | | 18.36999 | 0 |
| 9 | −85.99 | 1.332 | 1.642 | 22.406 | 17.25429 | 1.943639 |
| 10 | 8.0739 | 6.78 | | | 14.97064 | −1.608902 |
| Image plane | Infinite | | | | 13.40815 | 0 |

Figure 8:
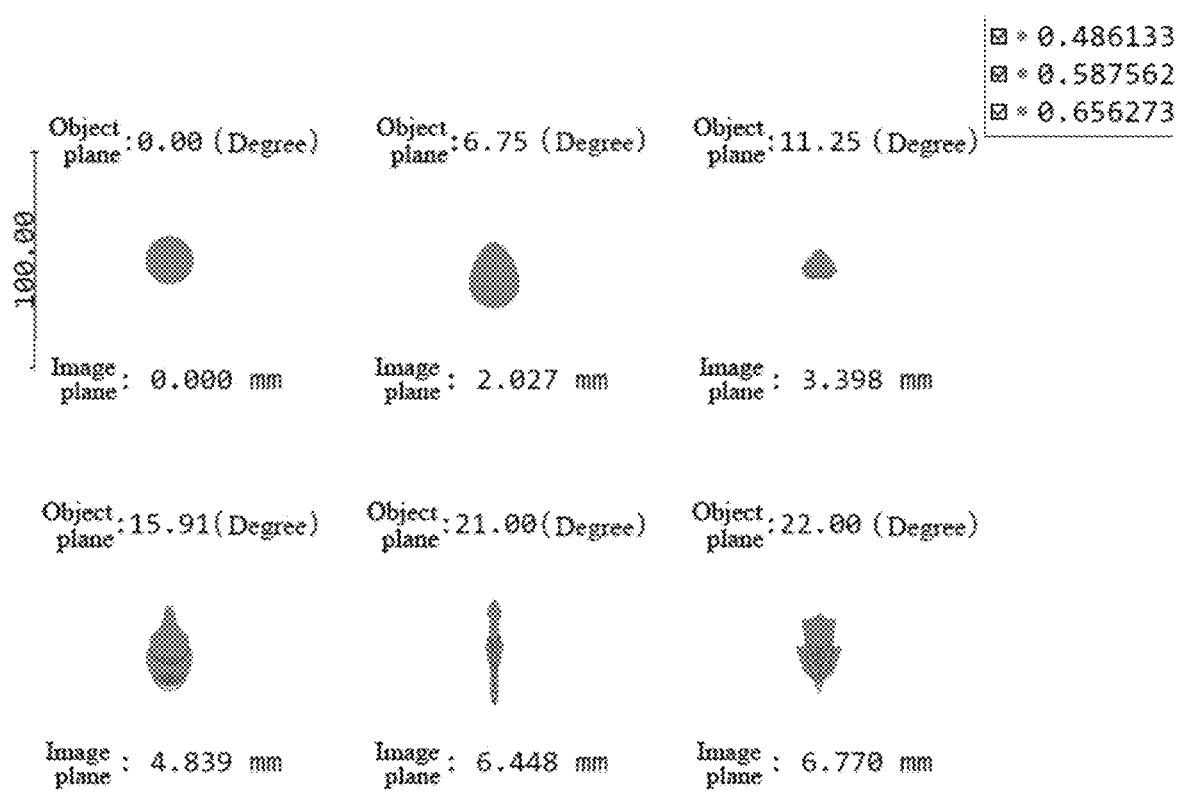
FIG. 8 is a schematic spot diagram of the eyepiece optical system according to the second embodiment of the present invention.

FIG. 8 has shown the spot diagram of the optical system according to the present embodiment. As shown, the lights of different field-of-views in the present embodiment have dispersion spots of small and uniform radii on the image plane (display device), and the dispersion spots formed by focusing lights of different wavelengths at the same field-of-view have low misalignment degree, such that the aberration of the optical system is finely corrected and a display image of integral uniformity and high optical performance can be observed through the optical system.

Figure 9:
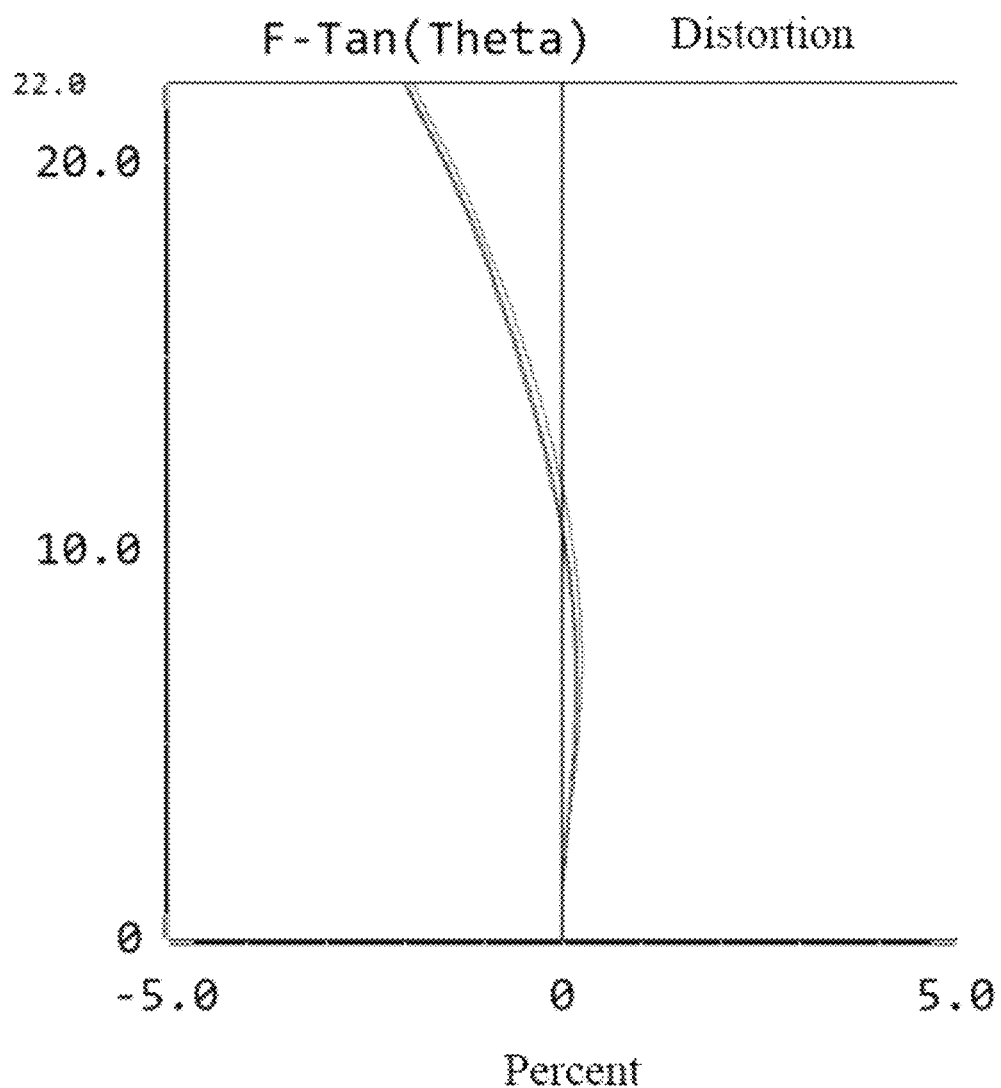
FIG. 9 is a schematic diagram of a distortion curve of the eyepiece optical system according to the second embodiment of the present invention.
Figure 10:
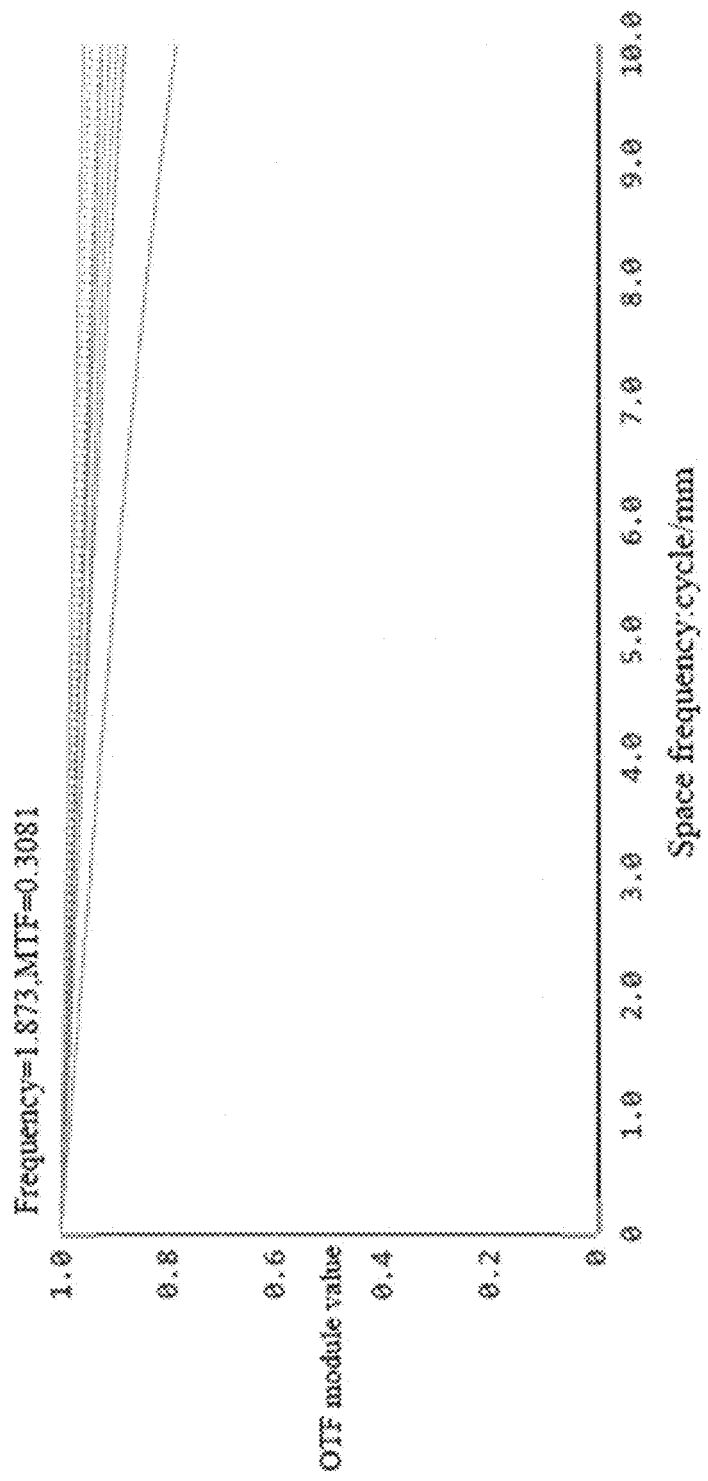
FIG. 10 is a schematic diagram of a MTF of the eyepiece optical system according to the second embodiment of the present invention.

FIG. 9 and FIG. 10 have respectively shown the distortion curve of the optical system according to the present embodiment, by which the characteristics of the optical system according to the present embodiment such as super large field-of-view and high imaging quality and so on, have been represented.

Embodiment 3

Figure 11:
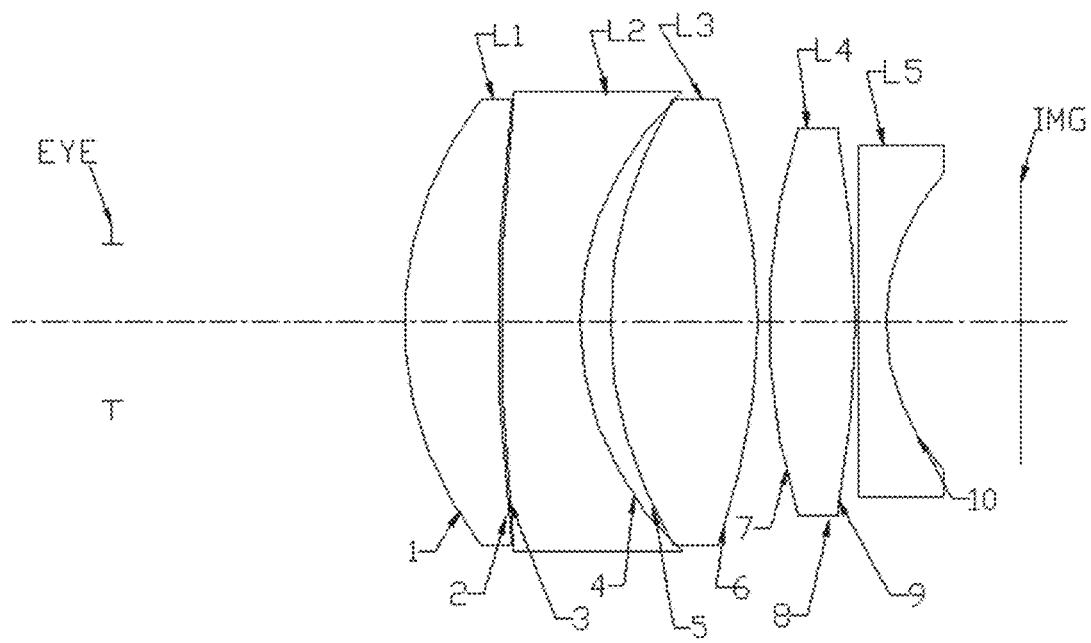
FIG. 11 is a schematic structural diagram of an eyepiece optical system according to a third embodiment of the present invention.
Figure 12:
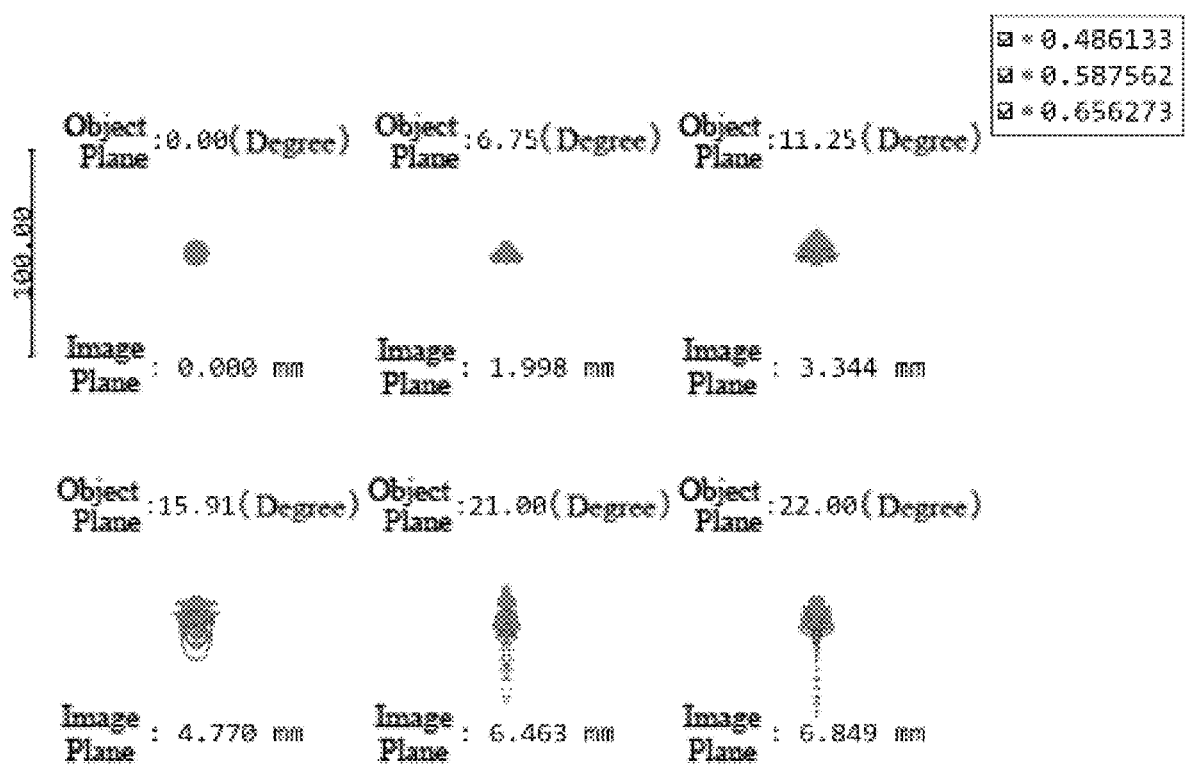
FIG. 12 is a schematic spot diagram of the eyepiece optical system according to the third embodiment of the present invention.
Figure 13:
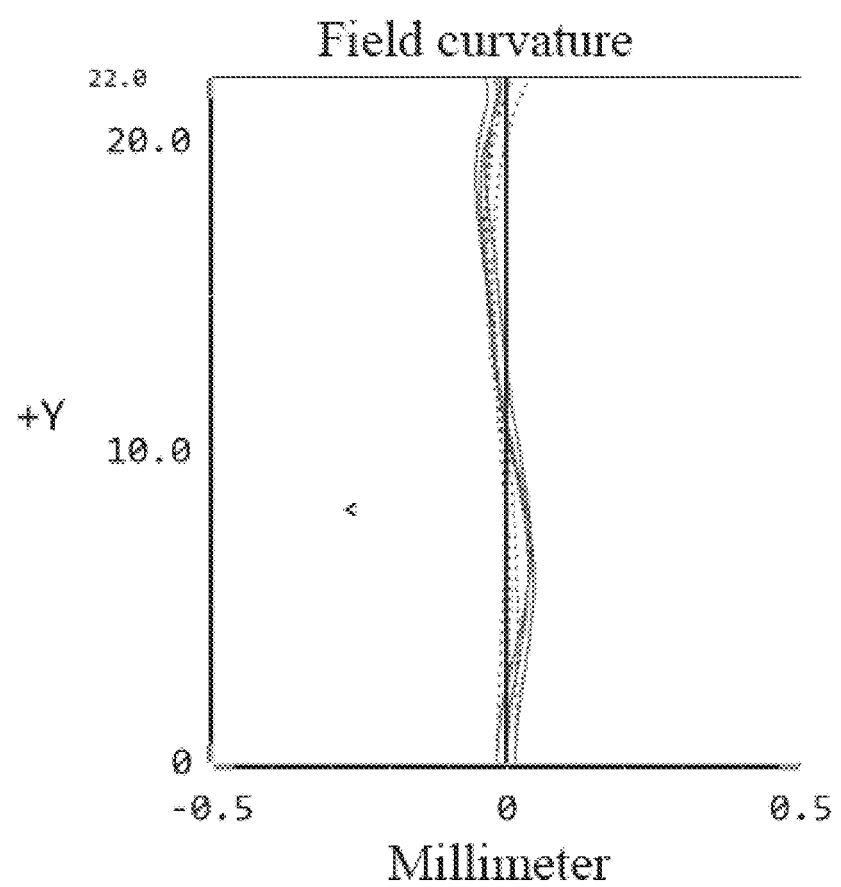
FIG. 13 is a schematic diagram of a field curvature curve of the eyepiece optical system according to the third embodiment of the present invention.
Figure 14:
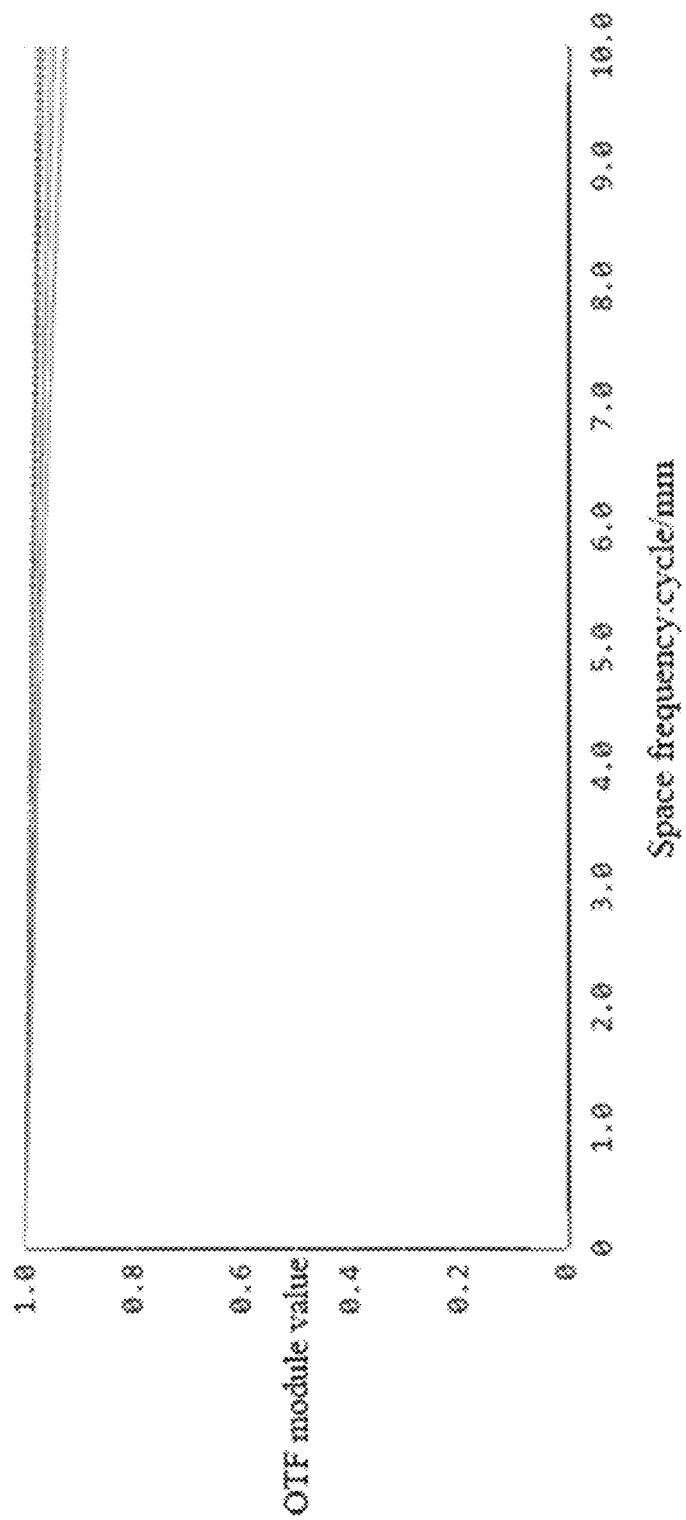
FIG. 14 is a schematic diagram of a MTF of the eyepiece optical system according to the third embodiment of the present invention.

A schematic structural diagram of the eyepiece optical system is as shown in FIG. 11, comprising a first lens L1, a second lens L2, a third lens L3, a fourth lens L4, and a fifth lens L5 arranged coaxially and successively along an optical axis direction from an eye viewing side to a displayer side. The optical surface closer to the diaphragm side is marked as 1, and by analogy, the optical surfaces from the diaphragm to the image plane are sequentially marked as 2, 3, 4, 5, 6, 7, 8, 9 and 10. The present embodiment can sufficiently correct aberrations, such as distortion, chromatism, and field curvature of the optical system, and provide a large field-of-view angle while guaranteeing a small volume.

TABLE 3

List of parameters of the optical system of Embodiment 3

| Surface | Curvature radius | Thickness | Glass Refractive index | Abbe number | Net caliber | Cone coefficient |
|---|---|---|---|---|---|---|
| Diaphragm | Infinite | 14 | | | 7.5 | 0 |
| 1 | 14.91196 | 4.56096 | 1.552 | 63.37 | 21.4 | −1.10 |
| 2 | 85.69253 | 0.0999778 | | | 21.32 | 0 |
| 3 | 18.16883 | 3.780066 | 1.642 | 22.40 | 21.3 | −20.32 |
| 4 | 6.725783 | 1.49 | | | 22.09 | −3.518 |
| 5 | 20.64492 | 7.044244 | 1.85 | 36.598 | 21.45 | 0 |
| 6 | −30.79003 | 0.5350411 | | | 21.39 | 0 |
| 7 | 15.00 | 4.12 | 1.883 | 40.868 | 18.62 | −0.32 |
| 8 | −53.55024 | 0.098 | | | 17.90 | 0 |
| 9 | 60.81 | 1.40 | 1.642 | 22.407 | 16.91 | −21.71 |
| 10 | 7.44 | 6.50 | | | 14.36 | −2.84 |
| Image plane | Infinite | | | | 13.70 | 0 |

As shown in FIG. 11 to FIG. 14, the lights of different field-of-views in the present embodiment have dispersion spots of small and uniform radii on the image plane (display device), and the dispersion spots formed by focusing lights of different wavelengths at the same field-of-view have low misalignment degree, such that the aberration of the optical system is finely corrected and a display image of integral uniformity and high optical performance can be observed through the optical system.

Embodiment 4

Figure 15:
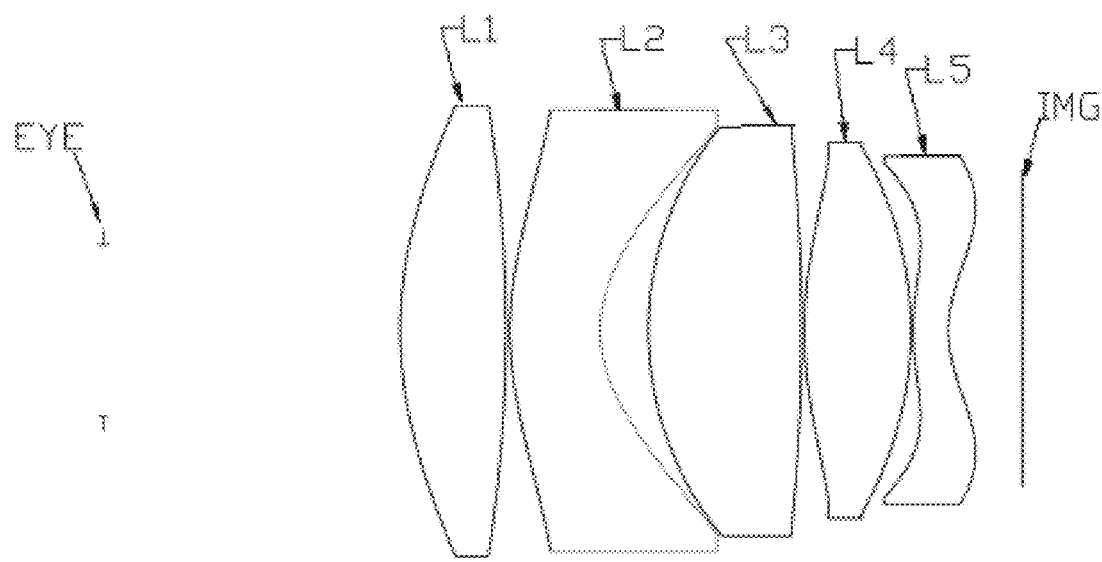
FIG. 15 is a schematic structural diagram of an eyepiece optical system according to a fourth embodiment of the present invention.
Figure 16:
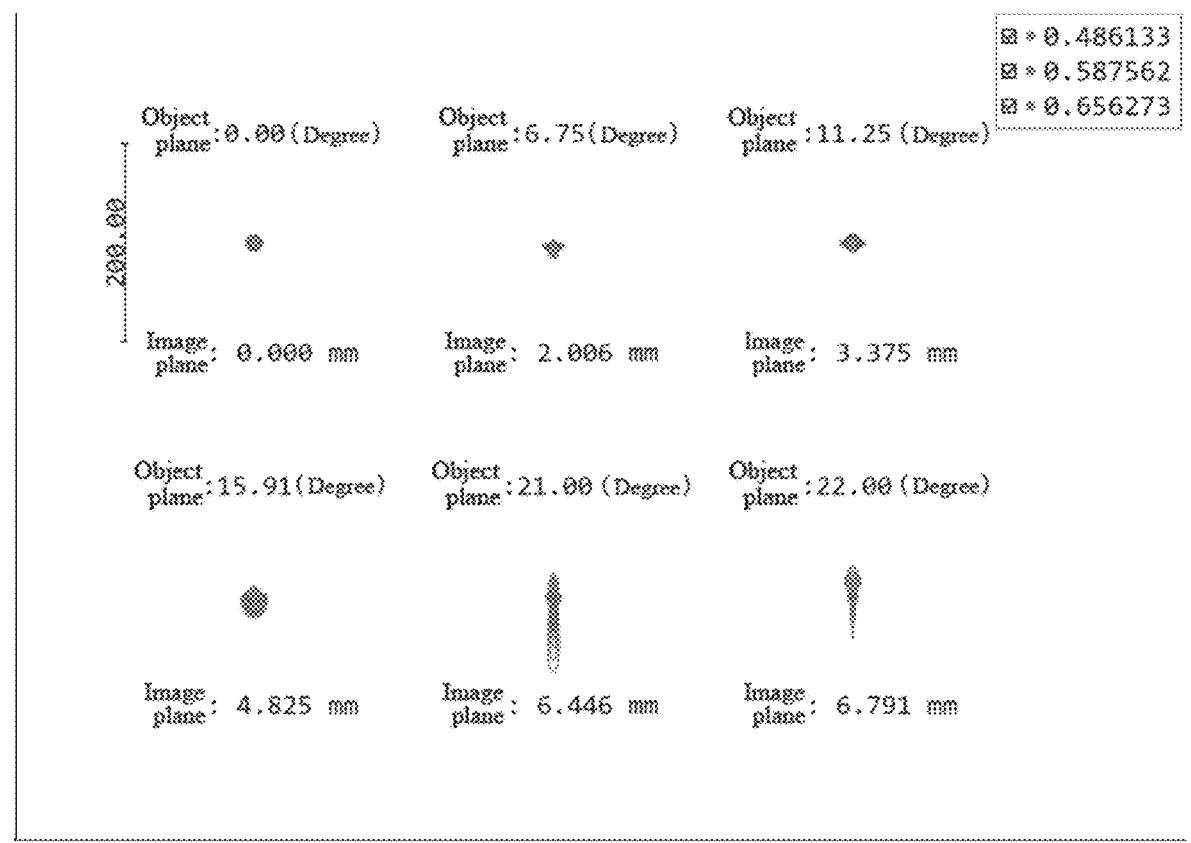
FIG. 16 is a schematic spot diagram of the eyepiece optical system according to the fourth embodiment of the present invention.
Figure 17:
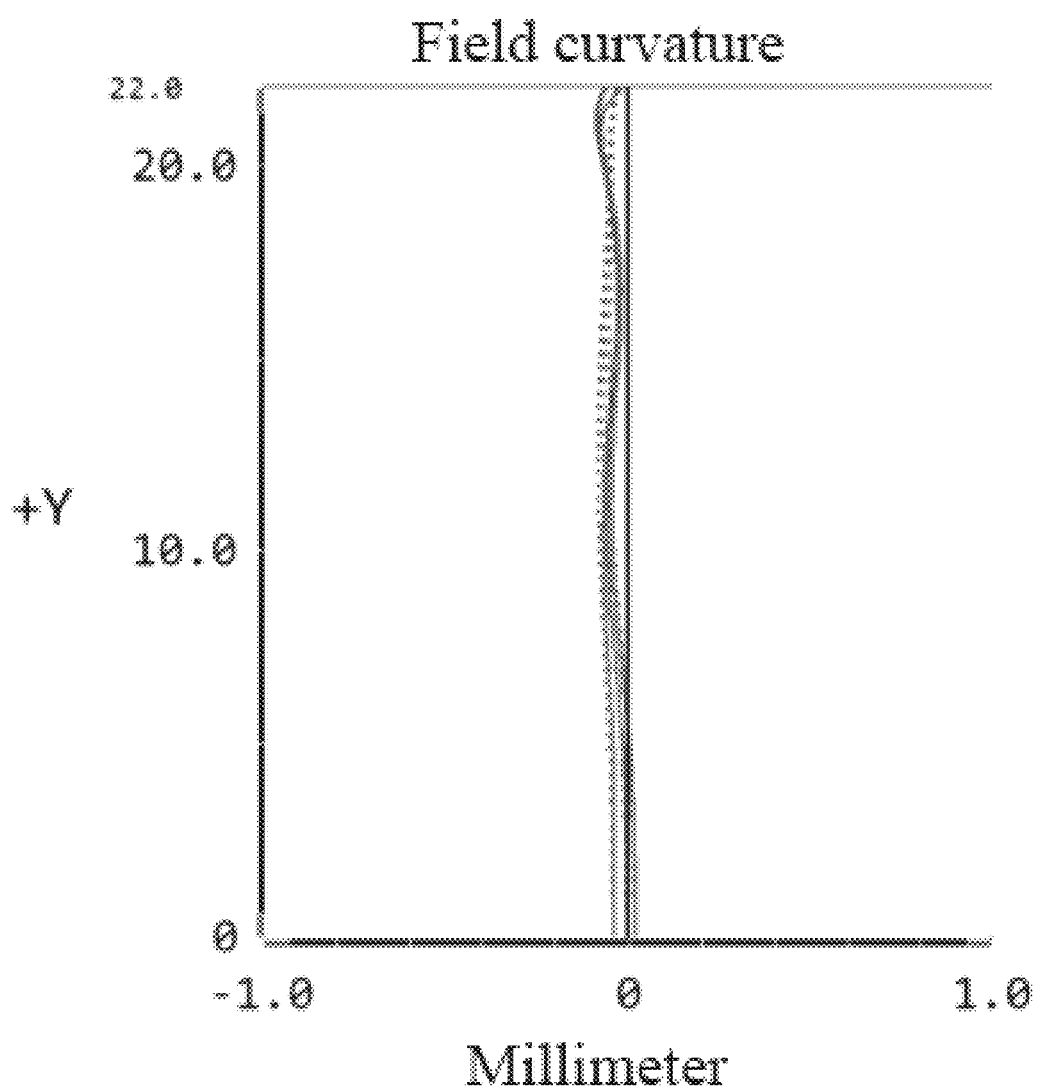
FIG. 17 is a schematic diagram of a field curvature curve of the eyepiece optical system according to the fourth embodiment of the present invention.

A schematic structural diagram of the eyepiece optical system is as shown in FIG. 15, comprising a first lens L1, a second lens L2, a third lens L3, a fourth lens L4, and a fifth lens L5 arranged coaxially and successively along an optical axis direction from an eye viewing side to a displayer side. The optical surface closer to the diaphragm side is marked as 1, and by analogy, the optical surfaces from the diaphragm to the image plane are sequentially marked as 2, 3, 4, 5, 6, 7, 8, 9 and 10. The present embodiment can sufficiently correct aberrations, such as distortion, chromatism, and field curvature of the optical system, and provide a large field-of-view angle while guaranteeing a small volume.

TABLE 4

List of parameters of the optical system of Embodiment 4

| Surface | Curvature radius | Thickness | Glass Refractive index | Abbe number | Net caliber | Cone coefficient |
|---|---|---|---|---|---|---|
| Diaphragm | Infinite | 12.969 | | | 7.5 | 0 |
| 1 | 17.483 | 4.596 | 1.713 | 53.868 | 19.63 | −2.293 |
| 2 | −64.19 | 0.179 | | | 19.684 | 0 |
| 3 | 13.918 | 3.926 | 1.632 | 23.416 | 19.26 | −7.017 |
| 4 | 5.348 | 2.103 | | | 17.767 | −2.174 |
| 5 | 14.05 | 6.695 | 1.668 | 41.957 | 17.947 | 0 |
| 6 | −84.85 | 0.129 | | | 17.23053 | 0 |
| 7 | 17.98 | 4.6285 | 1.4565 | 90.27 | 16.399 | 1.267 |
| 8 | −15.95 | 0.0996 | | | 15.95 | 0 |
| 9 | 10.36 | 1.53 | 1.649 | 21.45 | 14.616 | −5.605 |
| 10 | 5.307 | 3.26 | | | 15.18 | −2.152 |
| Image plane | Infinite | | | | 13.637 | 0 |

Figure 18:
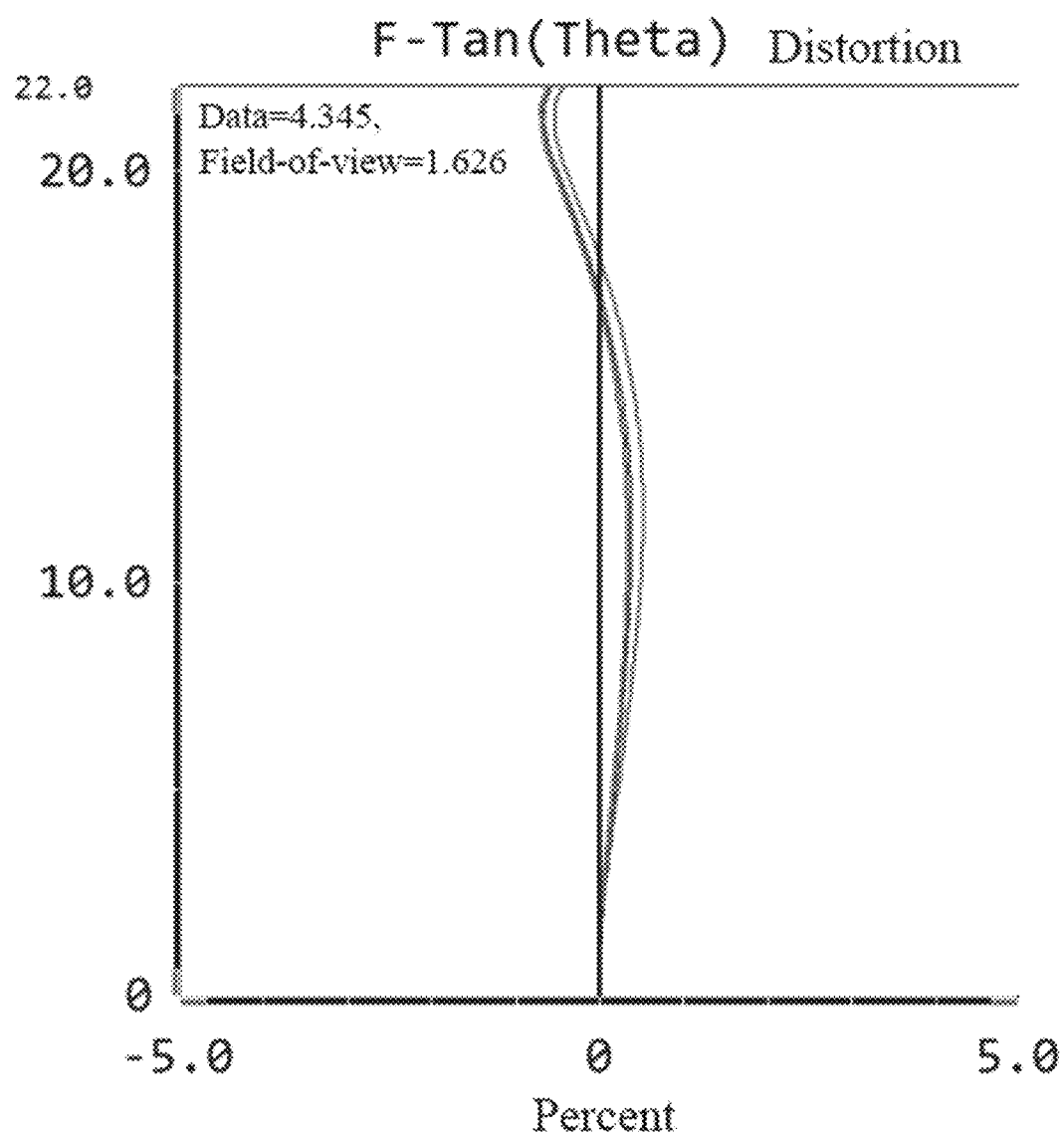
FIG. 18 is a schematic diagram of a distortion curve of the eyepiece optical system according to the fourth embodiment of the present invention.
Figure 19:
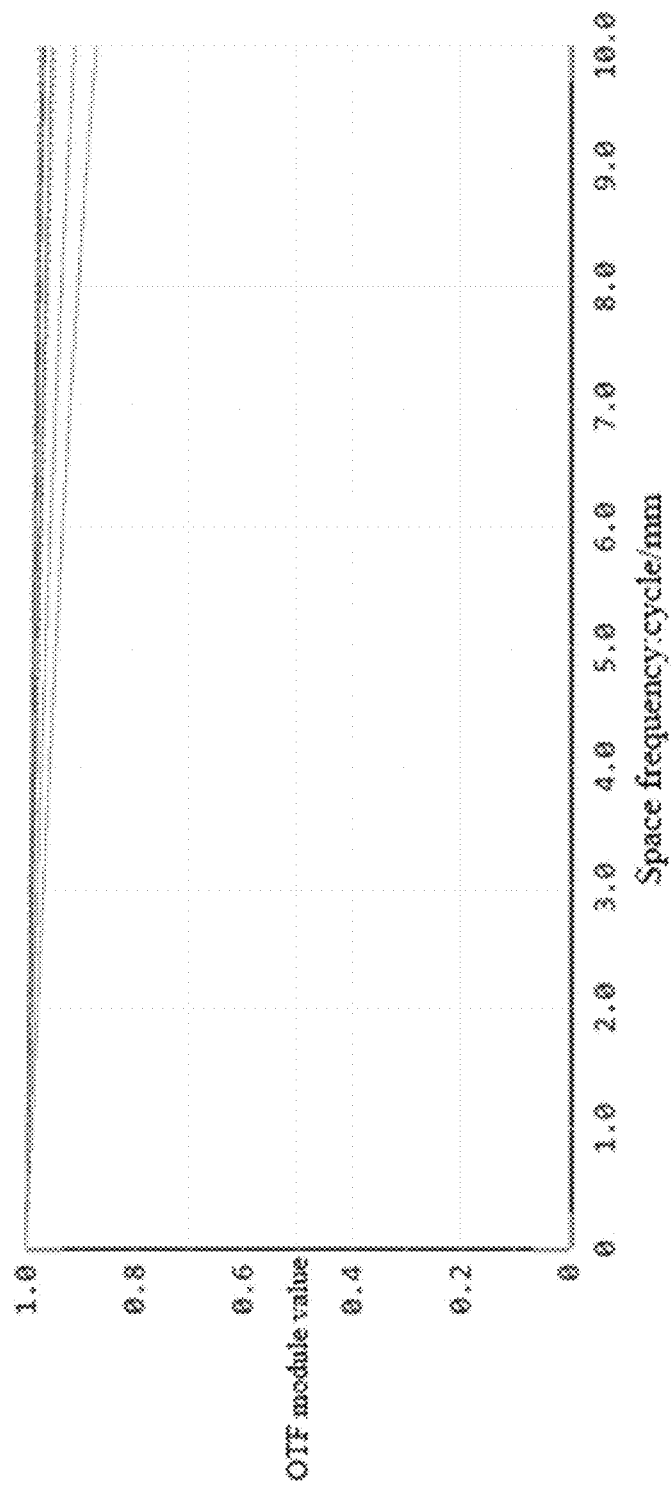
FIG. 19 is a schematic diagram of a MTF of the eyepiece optical system according to the fourth embodiment of the present invention.

As shown in FIG. 16 to FIG. 19, the geometric structure of the imaging of the optical system is reflected, and it can be seen from the MTF and the spot diagram of the optical system according to the fourth embodiment of the present invention that the lights of different field-of-views in the present embodiment have dispersion spots of small and uniform radii on the image plane (display device I), and the dispersion spots formed by focusing lights of different wavelengths at the same field-of-view have low misalignment degree, such that the aberration of the optical system is finely corrected and a display image of integral uniformity and high optical performance can be observed through the optical system. FIG. 18 has shown the field curvature and distortion curves of the optical system according to the first embodiment of the present invention, by which the characteristics of the optical system according to the present embodiment such as super large field-of-view and high imaging quality and so on, have been represented.

Embodiment 5

Figure 20:
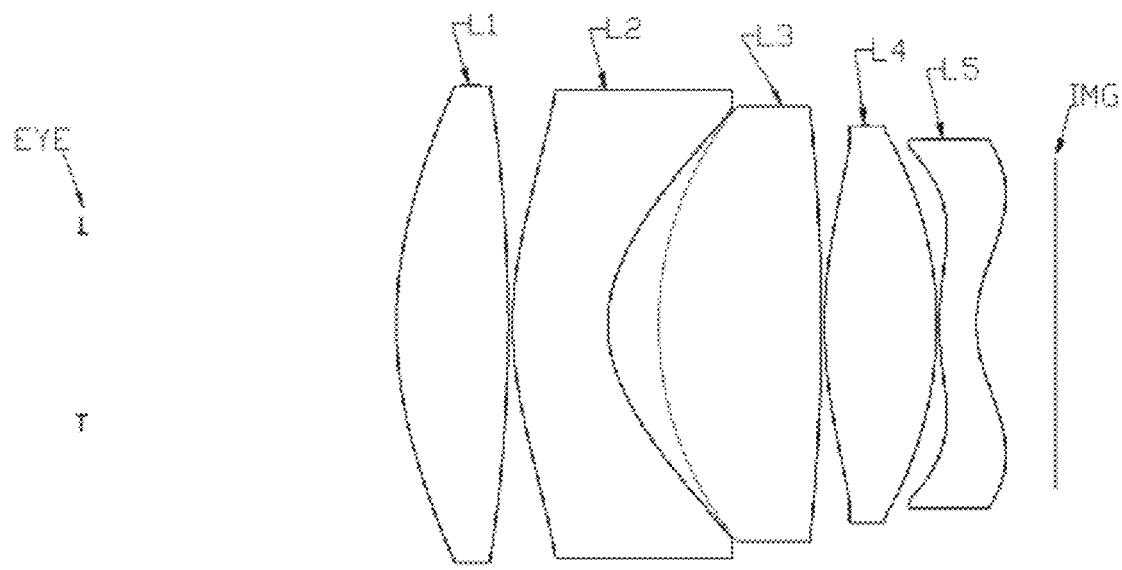
FIG. 20 is a schematic structural diagram of an eyepiece optical system according to a fifth embodiment of the present invention.
Figure 21:
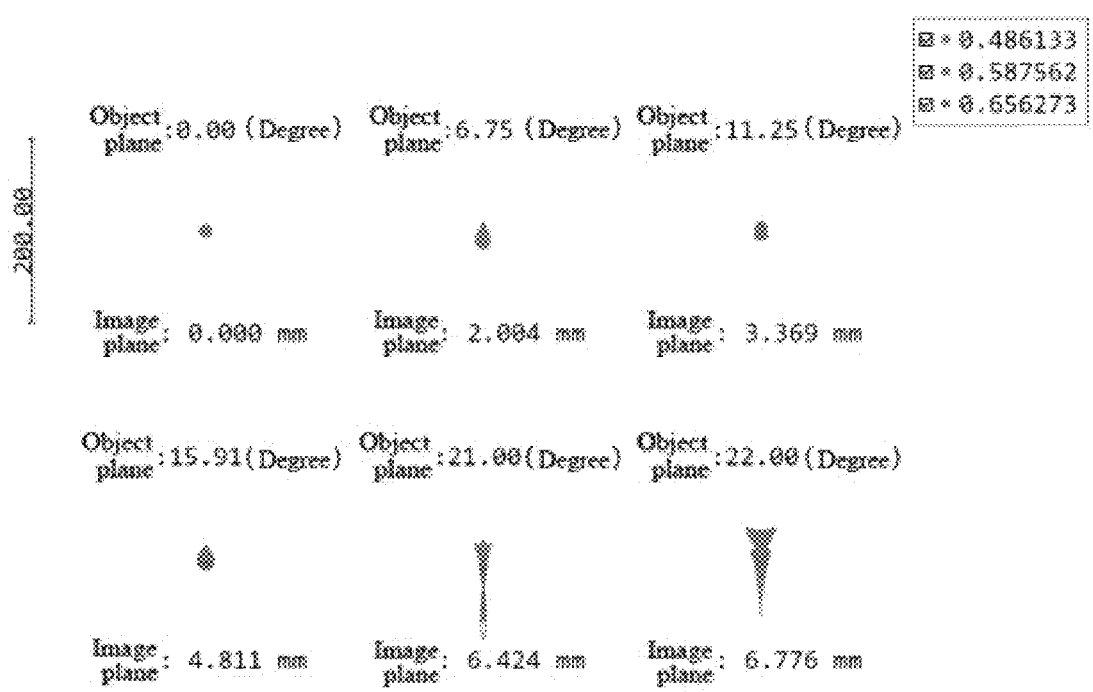
FIG. 21 is a schematic spot diagram of the eyepiece optical system according to the fifth embodiment of the present invention.
Figure 22:
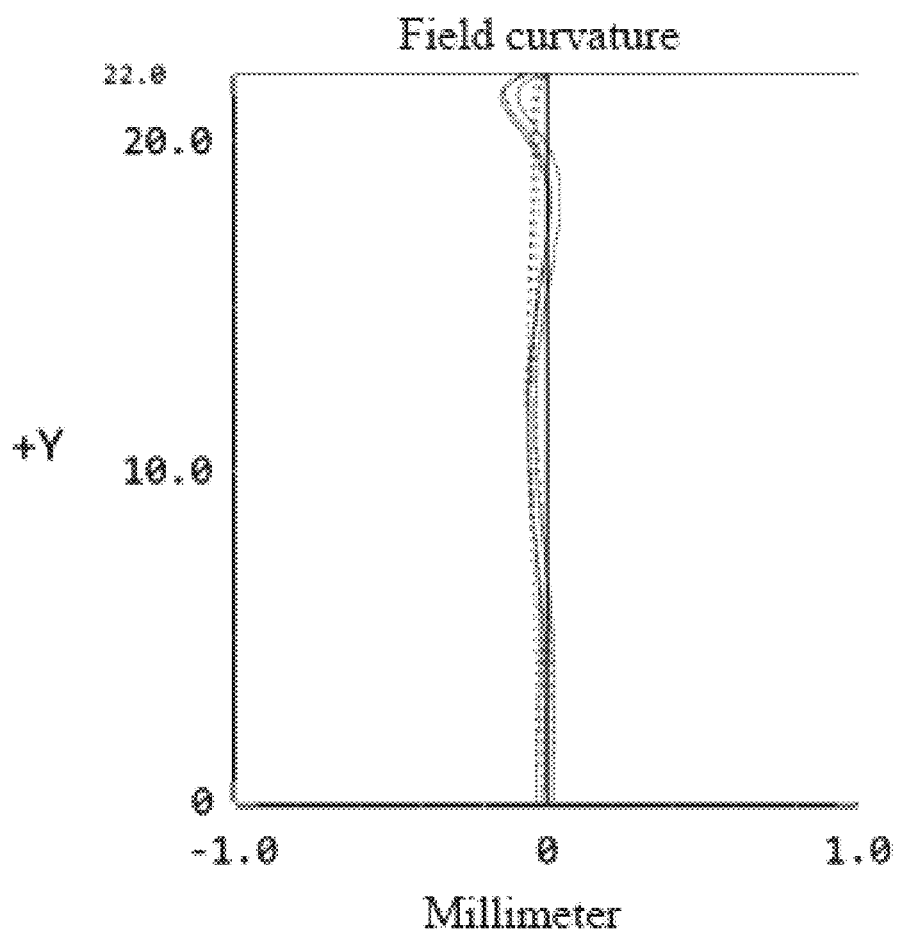
FIG. 22 is a schematic diagram of a field curvature curve of the eyepiece optical system according to the fifth embodiment of the present invention.
Figure 23:
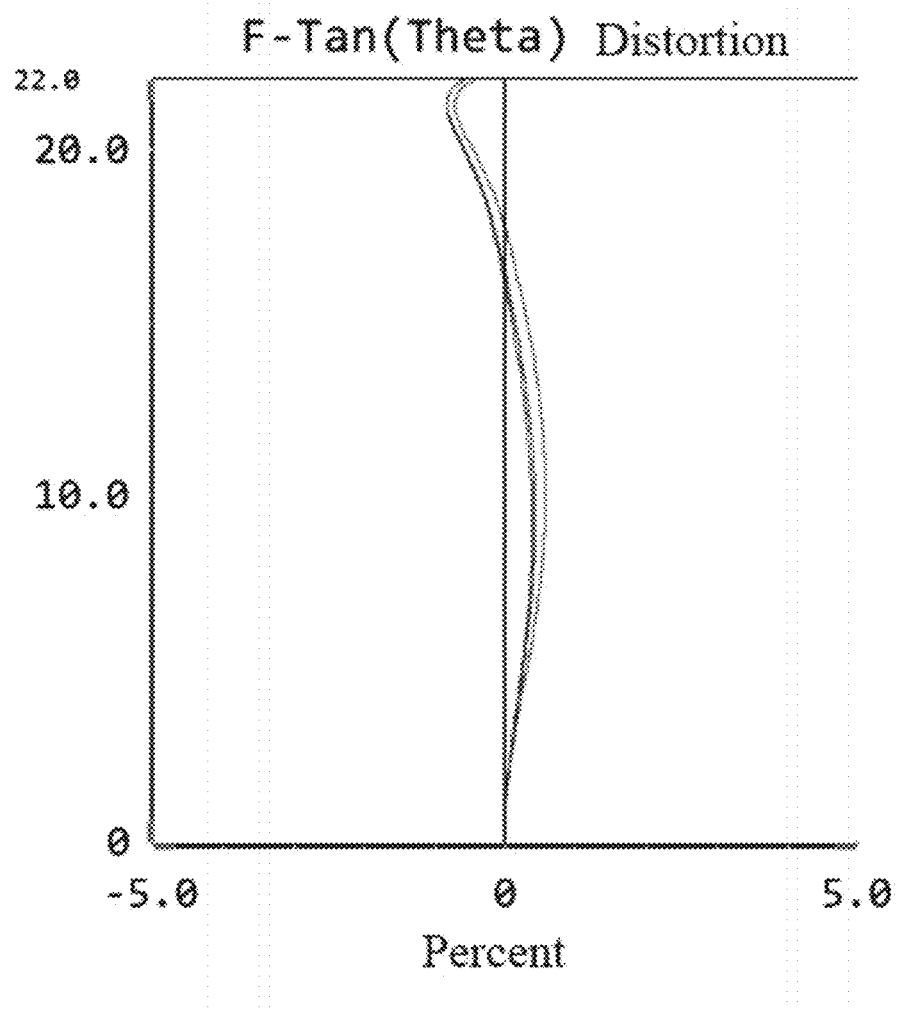
FIG. 23 is a schematic diagram of a distortion curve of the eyepiece optical system according to the fifth embodiment of the present invention.
Figure 24:
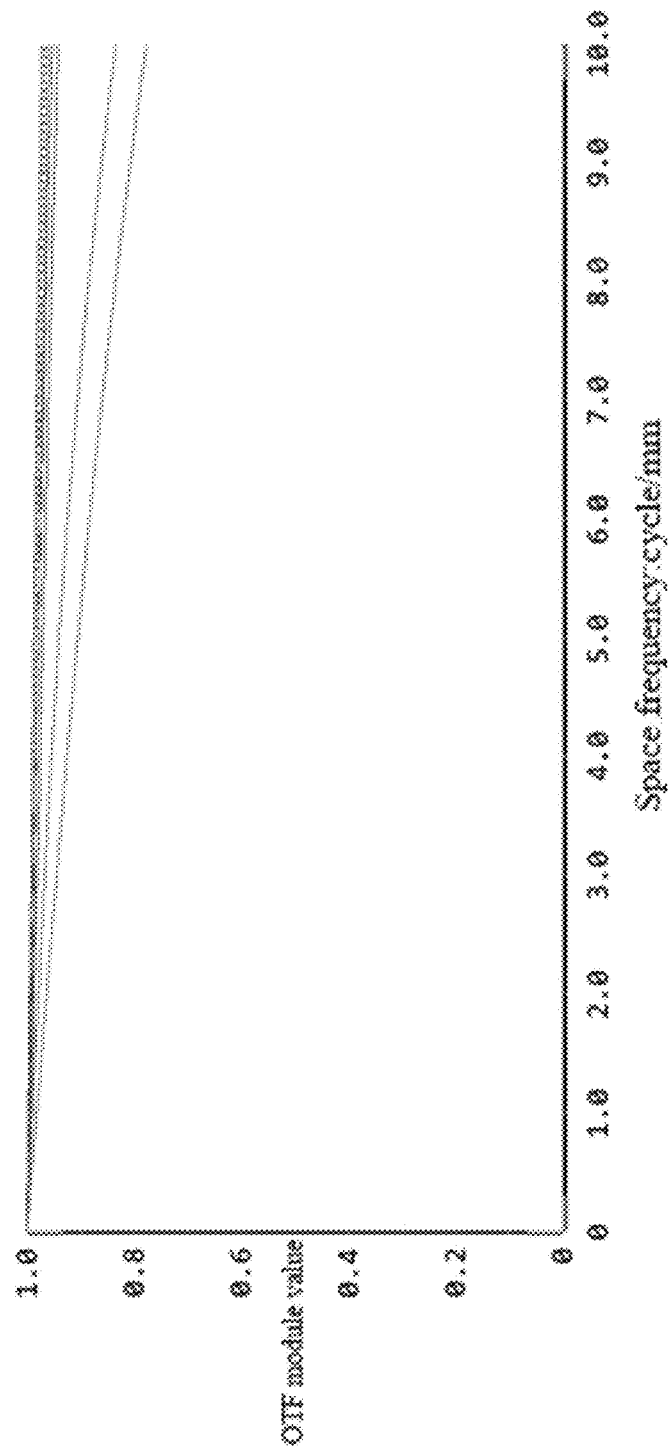
FIG. 24 is a schematic diagram of a MTF of the eyepiece optical system according to the fifth embodiment of the present invention.

A schematic structural diagram of the eyepiece optical system is as shown in FIG. 20, comprising a first lens L1, a second lens L2, a third lens L3, a fourth lens L4, and a fifth lens L5 arranged coaxially and successively along an optical axis direction from an eye viewing side to a displayer side. The optical surface closer to the diaphragm side is marked as 1, and by analogy, the optical surfaces from the diaphragm to the image plane are sequentially marked as 2, 3, 4, 5, 6, 7, 8, 9 and 10. The present embodiment can sufficiently correct aberrations, such as distortion, chromatism, and field curvature of the optical system, and provide a large field-of-view angle while guaranteeing a small volume.

TABLE 5

List of parameters of the optical system of Embodiment 5

| Surface | Curvature radius | Thickness | Glass Refractive index | Abbe number | Net caliber | Cone coefficient |
|---|---|---|---|---|---|---|
| Diaphragm | Infinite | 15 | | | 7.5 | 7.5 |
| 1 | 16.847 | 4.773 | 1.734 | 51.494 | 21.38 | 21.486 |
| 2 | −64.779 | 0.1789 | | | 21.486 | 21.486 |
| 3 | 12.51 | 3.42 | 1.631 | 23.416 | 21.095 | 21.095 |
| 4 | 5.116 | 2.783 | | | 18.98 | 21.095 |
| 5 | 14.5 | 6.3713 | 1.622 | 53.199 | 19.15 | 19.15 |
| 6 | −50.44 | 0.3346 | | | 18.60 | 19.15 |
| 7 | 18.867 | 4.39 | 1.4565 | 90.2697 | 16.964 | 16.964 |
| 8 | −19.97 | 0.103 | | | 16.320 | 16.964 |
| 9 | 9.3285 | 1.497 | 1.6497 | 21.45 | 15.270 | 15.694 |
| 10 | 5.1716 | 3.1349 | | | 15.69 | 15.694 |
| Image plane | Infinite | | | | 13.548 | 13.548 |

As shown in FIG. 21 to FIG. 24, in this embodiment, the imaging of the lights of various field-of-views in the image plane (display device) reaches more than 90% at the frequency of 5 lp, and the imaging quality of the lights of different wavelengths in the field-of-views is good. The overall aberration of the optical system is finely corrected and a display image of integral uniformity and high optical performance can be observed through the optical system.

In the above five embodiments, the effective focal length is 16.9 mm, the field-of-view angle is 2ω=44°, and each data in the embodiments satisfies the parameter requirement recorded in the specification, as shown in TABLE 6:

TABLE 6

Parameter values of the optical system in Embodiments 1-5

| | fd/fw | f34/fw | f5/fw | (R21 + R22)/(R21 − R22) | |(R51 + R52)/(R51 − R52)| |
|---|---|---|---|---|---|
| Embodiment 1 | 0.343 | 0.511 | −0.752 | 2.096 | 1.489 |
| Embodiment 2 | 0.401 | 0.481 | −0.676 | 3.866 | 0.83 |
| Embodiment 3 | 0.385 | 0.486 | −0.79 | 2.18 | 1.28 |
| Embodiment 4 | 0.192 | 0.654 | −1.125 | 2.248 | 3.1 |
| Embodiment 5 | 0.186 | 0.686 | −1.234 | 2.384 | 3.488 |

A head-mounted display in the present invention is further described below.

A head-mounted display device is provided, comprising a miniature image display unit and an eyepiece located between human eyes and the miniature image display unit, wherein the eyepiece comprises any one of the eyepiece optical system discussed above.

Preferably, a distance between the tenth optical surface 10 on the fifth lens L5 and the miniature image display unit is adjustable.

Preferably, the head-mounted display is a double-eye head-mounted display comprising same two of the eyepiece optical systems. The two optical systems correspond to the left eye and the right eye of an observer respectively. The observer can achieve a head-mounted display effect with properties such as a large field-of-view angle, low distortion, low chromatism, low field curvature, and low astigmatism through the optical system.

It should be understood that, for one of ordinary skill in the art, the foregoing description can be modified or altered, and all such modifications and alterations fall into the scope of the attached claims of the present invention.

What is claimed is:

1. An eyepiece optical system, wherein the optical system comprises a first lens, a second lens, a third lens, a fourth lens, and a fifth lens arranged coaxially and successively along an optical axis direction from an eye viewing side to a displayer side, wherein a focal length of the second lens is $f_2$, a focal length of a lens group formed by the third lens and the fourth lens is $f_{34}$, a focal length of the fifth lens is $f_5$, a back focal length from a display of the optical system to the fifth lens proximate to a surface of the display is $f_d$, a total system length is $f_w$, and they satisfy following relations (1), (2), (3), and (4):

$$-4.00 \leq f_2/f_w \leq -0.50 \quad (1);$$

$$0.35 \leq f_{34}/f_w \quad (2);$$

$$-10.00 \leq f_5/f_w \leq 0.20 \quad (3); \text{ and}$$

$$0.10 \leq f_d/f_w \leq 0.50 \quad (4).$$

2. The eyepiece optical system according to claim 1, wherein the first lens, the third lens, and the fourth lens are all positive lenses, the second lens and the fifth lens are negative lenses, and the first lens, the second lens, the third lens, the fourth lens, and the fifth lens are made of glass materials or plastic materials.

3. The eyepiece optical system according to claim 2, wherein the materials of the first lens, the second lens, and the third lens satisfy following relations (5), (6), and (7):

$$1.40 < Nd_1 < 1.90 \quad (5);$$

$$1.40 < Nd_2 < 1.80 \quad (6);$$

$$1.60 < Nd_3 < 1.90 \quad (7);$$

wherein $Nd_1$, $Nd_2$, and $Nd_3$ are material refractive indices of the first lens, the second lens, and the third lens, respectively.

4. The eyepiece optical system according to claim 3, wherein the materials of the first lens, the second lens, and the third lens satisfy following relations (8), (9), and (10):

$$40.0 < Vd_1 < 95.0 \quad (8);$$

$$19.0 < Vd_2 < 60.0 \quad (9);$$

$$28.0 < Vd_3 < 57.0 \quad (10);$$

wherein $Vd_1$, $Vd_2$, and $Vd_3$ represent Abbe coefficients of the first lens, the second lens, and the third lens, respectively.

5. The eyepiece optical system according to claim 4, wherein among the ten optical surfaces from the first optical surface to the tenth optical surface, several optical surfaces are even-order aspherical face shapes, and a formula of their face shapes is as following expression (11):

$$Z = \frac{cr^2}{1 + \sqrt{1-(1+k)c^2r^2}} + \alpha_2 r^2 + \alpha_4 r^4 + \alpha_6 r^6 + \ldots \quad (11)$$

6. The eyepiece optical system according to claim 4, wherein the Abbe coefficients $Vd_1$, $Vd_2$, and $Vd_3$ of the first lens, the second lens, and the third lens further satisfy following relations (8a), (9a), and (10a):

$$41.5 < Vd_1 < 90.5 \quad (8a);$$

$$20.0 < Vd_2 < 56.0 \quad (9a); \text{ and}$$

$$29.0 < Vd_3 < 56.0 \quad (10a).$$

7. The eyepiece optical system according to claim 3, wherein the refractive indices $Nd_1$, $Nd_2$, and $Nd_3$ of the first lens, the second lens, and the third lens further satisfy following relations (5a), (6a), and (7a):

$$1.50 < Nd_1 < 1.85 \quad (5a);$$

$$1.45 < Nd_2 < 1.75 \quad (6a); \text{ and}$$

$$1.63 < Nd_3 < 1.87 \quad (7a).$$

8. The eyepiece optical system according to claim 1, wherein
the first lens has a first optical surface convex to an eye and a second optical surface concave to the eye;
the second lens has a third optical surface convex to the eye and a fourth optical surface concave to the eye;
the third lens has a fifth optical surface convex to the eye and a sixth optical surface convex to an image plane;
the fourth lens has a seventh optical surface convex to the eye and an eighth optical surface convex to the image plane; and
the fifth lens has a ninth optical surface concave to the image plane and a tenth optical surface concave to the eye.

9. The eyepiece optical system according to claim 8, wherein the second optical surface on the first lens, the fifth optical surface and the sixth optical surface on the third lens, and the eighth optical surface on the fourth lens are spherical face shapes, and the other optical surfaces are all even-order aspherical face shapes.

10. The eyepiece optical system according to claim 1, wherein a curvature radius of the optical surface of the fifth lens proximate to a human eye side is $R_{51}$, a curvature radius of the optical surface proximate to the side of the display is $R_{52}$, and $R_{51}$ and $R_{52}$ satisfy following relation (12):

$$0.5 \leq |(R_{51}+R_{52})/(R_{51}-R_{52})| \leq 4.0 \quad (12).$$

11. The eyepiece optical system according to claim 10, wherein the curvature radii $R_{51}$ and $R_{52}$ of the fifth lens further satisfy following relation (12a):

$$0.51 \leq |(R_{51}+R_{52})/(R_{51}-R_{52})| \leq 3.5 \quad (12a).$$

12. The eyepiece optical system according to claim 1, wherein a curvature radius of the optical surface of the second lens proximate to a human eye side is $R_{21}$, a curvature radius of the optical surface proximate to the side of the display is $R_{22}$, and $R_{21}$ and $R_{22}$ satisfy following relation (13):

$$0.8 \leq (R_{21}+R_{22})/(R_{21}-R_{22}) \leq 6.0 \quad (13).$$

13. The eyepiece optical system according to claim 12, wherein the curvature radii $R_{21}$ and $R_{22}$ of the second lens further satisfy following relation (13a):

$$0.9 \leq ((R_{21}+R_{22})/(R_{21}-R_{22}) \leq 5.5 \quad (13a).$$

14. The eyepiece optical system according to claim 1, wherein the focal lengths of the second lens, the third lens, the fourth lens, and the fifth lens further satisfy following relations (1a), (2a), (3a), and (4a):

$$-3.60 \leq f_2/f_w \leq -0.85 \quad (1a);$$

$$0.40 \leq f_{34}/f_w \quad (2a);$$

$$-9.95 \leq f_5/f_w \leq 0.180 \quad (3a); \text{ and}$$

$$0.175 \leq f_d/f_w \leq 0.415 \quad (4a).$$

15. A head-mounted display, comprising a miniature image display unit and an eyepiece located between human eyes and the miniature image display unit, wherein the eyepiece comprises the eyepiece optical system according to claim 1.

16. The head-mounted display according to claim 15, wherein a distance between the tenth optical surface on the fifth lens and the miniature image display unit is adjustable.

17. The head-mounted display according to claim 15, wherein the head-mounted display is a double-eye head-mounted display comprising same two of the eyepiece optical systems.

* * * * *